United States Patent [19]
Snyder

[11] Patent Number: 4,934,630
[45] Date of Patent: Jun. 19, 1990

[54] POWERED AIRFOIL CANOPY AIRCRAFT

[76] Inventor: Stephen L. Snyder, 420 Pleasant Valley Ave., Moorestown, N.J. 08057

[21] Appl. No.: 358,481

[22] Filed: May 30, 1989

Related U.S. Application Data

[63] Continuation of Ser. No. 586,832, Mar. 6, 1984, abandoned, which is a continuation-in-part of Ser. No. 487,221, Mar. 11, 1983.

[51] Int. Cl.$^5$ ............................................. B64C 39/00
[52] U.S. Cl. .................................... 244/13; 244/902; 244/903; 244/69
[58] Field of Search .................. 244/13, 16, 145, 235, 244/900, 902, 903, 65, 66, 69, 6, 8, 2, 152, 153 R, 45 A; 416/129

[56] References Cited

U.S. PATENT DOCUMENTS

| | | | |
|---|---|---|---|
| 1,174,679 | 3/1916 | Carroll | 244/76 A |
| 1,431,244 | 10/1922 | Mendel | 244/76 A |
| 1,523,386 | 1/1925 | Baer | 244/45 A |
| 2,006,805 | 7/1935 | Gwinn, Jr. | 244/69 |
| 2,938,679 | 5/1960 | Walker, Jr. | 244/17.11 |
| 3,931,943 | 1/1976 | Westergren et al. | 244/235 |
| 4,071,206 | 1/1978 | Magill | 244/4 A |
| 4,375,280 | 3/1983 | Nicolaides | 244/13 |
| 4,426,049 | 1/1984 | Stewart | 244/69 |

FOREIGN PATENT DOCUMENTS

| | | | |
|---|---|---|---|
| 278784 | 8/1988 | European Pat. Off. | 244/903 |
| 1182962 | 12/1964 | Fed. Rep. of Germany | 244/DIG. 1 |

OTHER PUBLICATIONS

Nicolaides, "Parafoil Powered Flight Performance" AFFDL-TR-72-23, 1972.

Primary Examiner—Galen Barefoot
Attorney, Agent, or Firm—Fleit, Jacobson, Cohn, Price, Holman & Stern

[57] ABSTRACT

Load lines connect chordwise spaced portions of a ram air inflated, airfoil canopy to spaced anchors connected to a pilot supporting vehicle frame on which a forward thrust producing unit is removably mounted. The geometry of the assembled aircraft enhances take-off inflation of the canopy, establishes a stable flight frame when airborne, and enables simple engine throttle control of the thrust producing unit to regulate climb, descent and level flight. Common control is applied for both ground steering of the vehicle frame and air-borne steering of the canopy.

31 Claims, 13 Drawing Sheets

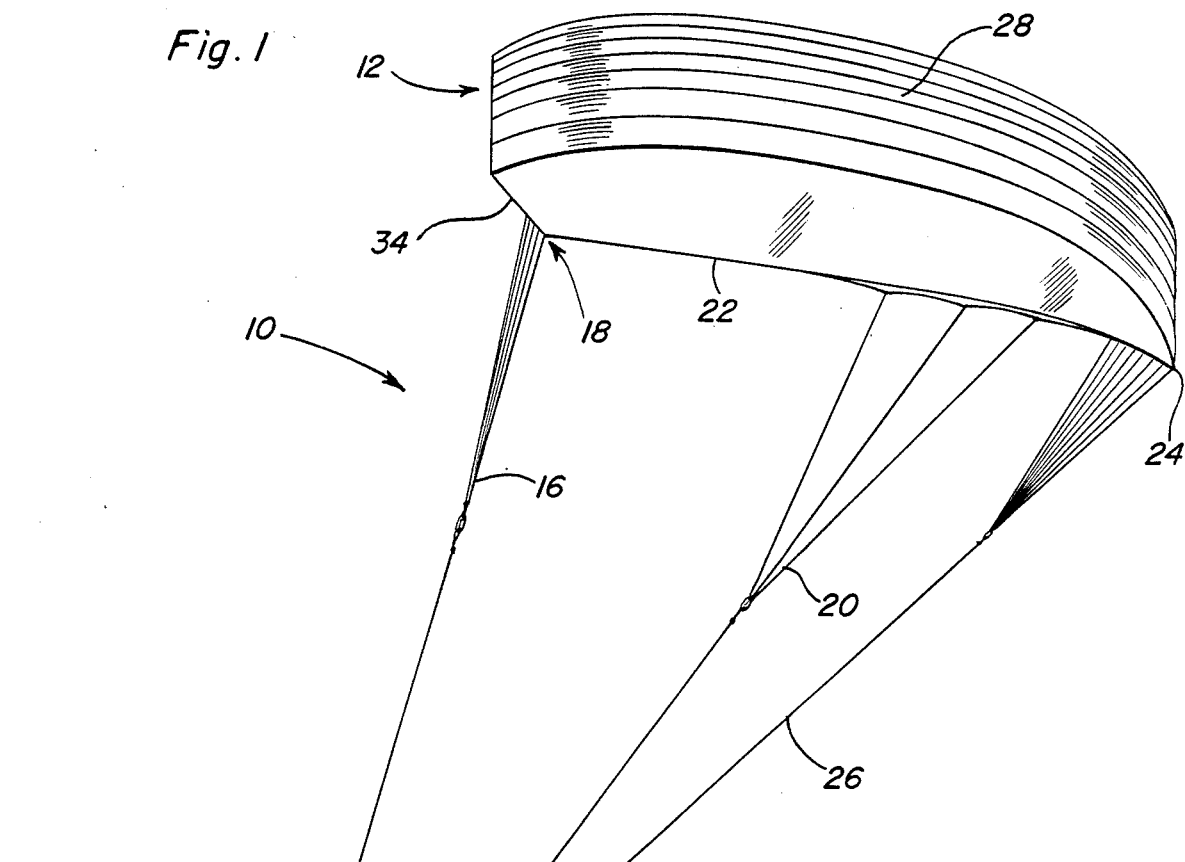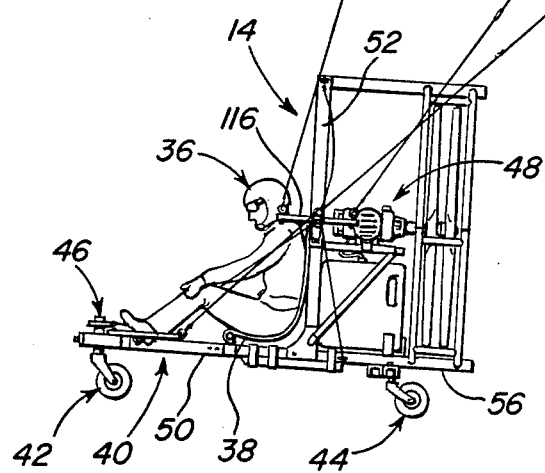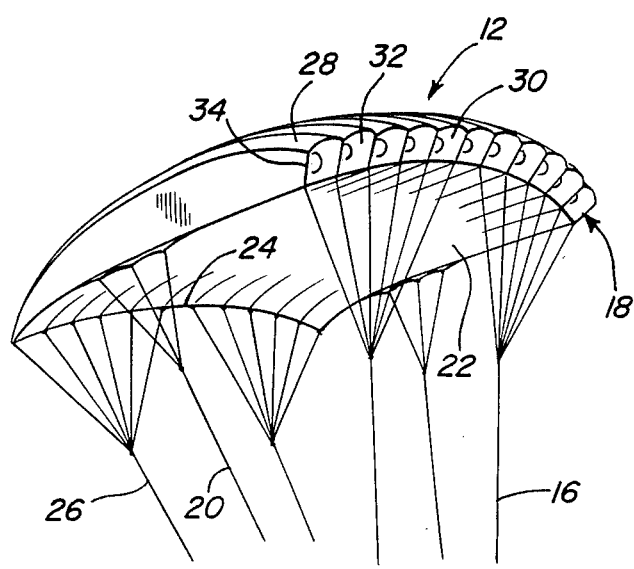

LEVEL FLIGHT

T=D
Lv=W
R=R'

TAKE-OFF

T > D

CLIMB $T \approx D$ $L_V > W$

NON-POWERED DESCENT $R \approx L_V \approx W$ $T = 0$

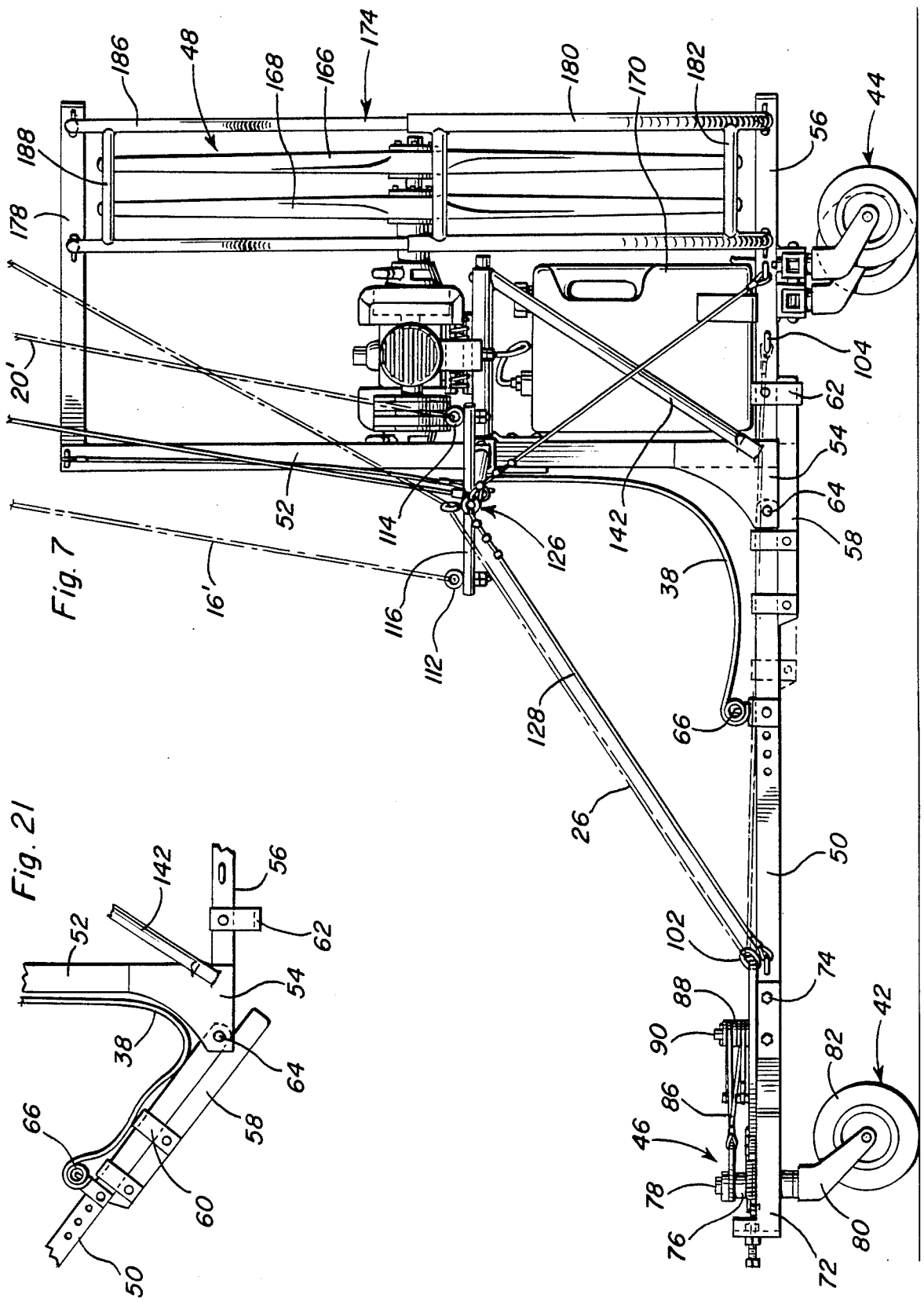

POWERED AIRFOIL CANOPY AIRCRAFT

CROSS REFERENCE TO RELATED APPLICATION

This application is a continuation of co-pending application, Ser. No. 586,832, filed Mar. 6 1984 now abandoned which in turn continuation-in-part of Ser. No. 487,221 filed Mar. 11, 1983.

BACKGROUND OF THE INVENTION

This invention relates generally to a class of lightweight aircraft, referred to as "ultralights" and more particularly to an aircraft receiving its lift from an inflatable canopy type of flexible airfoil wing.

Ultralight aircraft more commonly featured today for recreational and sporting purposes involve use of relatively rigid wings as part of a glider type airframe mounting a lightweight powered propeller. Such aircraft although exceedingly light in weight are dimensionally extensive and bulky so as to create ground transport difficulties and storage problems. Further, such aircraft require highly skilled pilots and are subject to stall, spin and other uncontrollable conditions in the hands of inexperienced pilots.

In comparison with the foregoing types of "ultralights", a powered flight vehicle having a flexible airfoil canopy associated therewith provides a substantially smaller aircraft that is collapsible to a more compact condition for ground transport and storage. Such aircraft are already known as disclosed, for example, in a published U.S. Air Force Technical Report AFFDL-72-73, entitled "Parafoil Powered Flight Performance", authored by John D. Nicolaides. This type of aircraft has, however, been found to have various control and handling problems. Accordingly, the inflated airfoil canopy type of aircraft has not been heretofore seriously considered as as a marketable "ultralight".

It is therefore an important object of the present invention to provide a powered flight vehicle having a ram air inflatable, airfoil wing canopy, as an "ultralight" not subject to unsafe flight hazards such as stall and spin.

A further object in accordance with the foregoing object is to provide an "ultralight" aircraft that is so easy and simple to pilot as to enable safe solo flight by relatively inexperienced persons since pitch and roll controls are not required.

Yet another object of the present invention is to provide a flight vehicle construction for the foregoing type of "ultralight" aircraft that is collapsible and foldable into a most compact form.

A still further object is to provide the foregoing type of aircraft that is readily easy to launch or condition for take-off, and easy or simple to control during flight including directional steering, climb and descent.

SUMMARY OF THE INVENTION

In accordance with the present invention, a three wheel flight vehicle is associated with a ram air inflated type of rectangular airfoil canopy as disclosed in U.S. Pat. No. 3,724,789 to Snyder, having chordwise extending air cells. The air cells are separated by ribs and are open at a leading edge of the canopy formed by a spanwise intake face from which the canopy fabric on the top and bottom surfaces taper along airfoil curvature to the trailing edge. Load suspension lines extend from the leading edge and from the bottom surface at locations intermediate the leading and trailing edges to two laterally spaced pairs of longitudinally spaced pivot anchors on the flight vehicle. Each pair of longitudinally spaced pivot anchors are mounted on an anchor arm to establish a geometrical relationship between the vehicle and inflated canopy through the load lines which produces an automatic change in attitude of the canopy between take-off and level flight positions to establish a stable airborne supporting flight frame. In the take-off attitude, the canopy is in a position of optimum angle of attack to inflate and lift the canopy from ground behind the vehicle to an overhead flight position. Thus, canopy inflation and lift is properly maximized for take-off until the forward thrust imparted to the vehicle accelerates it to a constant forward cruising speed of 25 MPH, for example. As the vehicle becomes airborne and reaches its constant cruising speed, the attitude of the canopy relative to ground changes in dependence on the forward thrust exerted on the vehicle. Because of lift and drag forces aerodynamically produced on the canopy and the force moment relationships associated with the aircraft geometry, the possibility of stall and spin is almost non-existent. By controlling the magnitude of the forward thrust, climb (or descent) of the aircraft may be regulated until a balance is achieved between forward thrust, gravitational load and aerodynamic forces on the canopy causing it to assume a level flight attitude at the constant cruising speed aforementioned.

Forward thrust is imparted to the vehicle, with lateral thrust components balanced, by counter-rotating pusher propellers independently driven through coaxial transmission drive trains connected to separate internal combustion engines in accordance with one embodiment of the invention. Thus, joint throttle control of the engines may be utilized to change the forward thrust imparted to the vehicle to regulate climb or descent, and to achieve and maintain level flight.

Ground steering control of the vehicle frame is effected through a front end mounted dirigible wheel assembly, while a pair of rear swivelly mounted caster wheels automatically change the forward direction of ground supported travel in response to the lateral force of cross winds. Take-off in the direction of prevailing winds is thereby assured for maintaining full canopy inflation during the take-off phase of operation. Front end ground steering control is effected through a pair of foot actuated steering levers mounted on the vehicle frame. The same steering control levers are also operative through steering control lines to directionally control forward motion of the canopy during flight by deflection of spanwise opposite portions of the trailing edge of the canopy. Pilot confusion and error is thereby minimized, by utilizing the common steering controls.

The change in canopy attitude aforementioned, will not only depend on forward thrust control, but also on the optimum location of the vehicle load or its center of gravity relative to the two pivot anchors at which the canopy load lines are attached to the vehicle. Locational adjustment of the vehicle center of gravity is effected prior to take-off in accordance with the weight of the pilot by preselecting the adjusted positions at which the anchor arms are locked to the vehicle frame during flight.

In accordance with one embodiment of the invention, the anchor arms are fixed to the ends of positioning lever elements connected by double hinges to a fixed cross bar mounted on a vertical mast forming part of the vehicle frame which includes an elongated frame member extending parallel to the longitudinal axis of the vehicle. The double hinges establish vertical adjustment axes about which the anchor arms are pivotally displaced horizontally to the adjusted locations set by releasable engagement with frame anchored flexible cable loops at preselected locking locations. The double hinges also establish horizontal axes about which the positioning lever elements pivotally elevate the anchor arms to the operative positions in response to tension in the load lines produced by lift forces on the canopy. In such operative positions, the cable loops become taut to lock the anchor arms at the adjusted locations and limit extension of the positioning lever elements from retracted positions.

The rearwardly mounted caster wheels aforementioned, are carried on legs pivotally extended by more than 180° from a pair of cross channel members fixed to a pivotally foldable rear end section of the longitudinal frame member. Thus, the caster wheels will be closely spaced from each other, with the legs in retracted positions abutting parallel mounting bars projecting rearwardly from the aforementioned cross bar of the vehicle frame when folded into compact form.

The mounting bars projecting rearwardly from the cross bar of an erected vehicle frame, support a platform with shock absorbers for mounting of the two engines, the transmission and the counter-rotating propellers aforementioned as a powered thrust producing unit. The unit is thereby also readily disassembled from the erected vehicle frame which may then be folded into a compact condition as aforementioned. Further, a collapsible type of open-frame propeller guard is readily assembled onto the erected vehicle frame at its rear end in protective relation to the counter-rotating propellers.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of a typical aircraft constructed in accordance with the present invention, during flight.

FIG. 2 is a perspective view of the inflated flexible canopy wing portion of the aircraft shown in FIG. 1.

FIG. 7 is a side elevational view of the flight vehicle portion of the aircraft.

FIG. 21 is a side elevational view of a portion of the flight vehicle shown in FIG. 7, in a partially folded condition.

DETAILED DESCRIPTION OF PREFERRED EMBODIMENTS

Figure 1A:
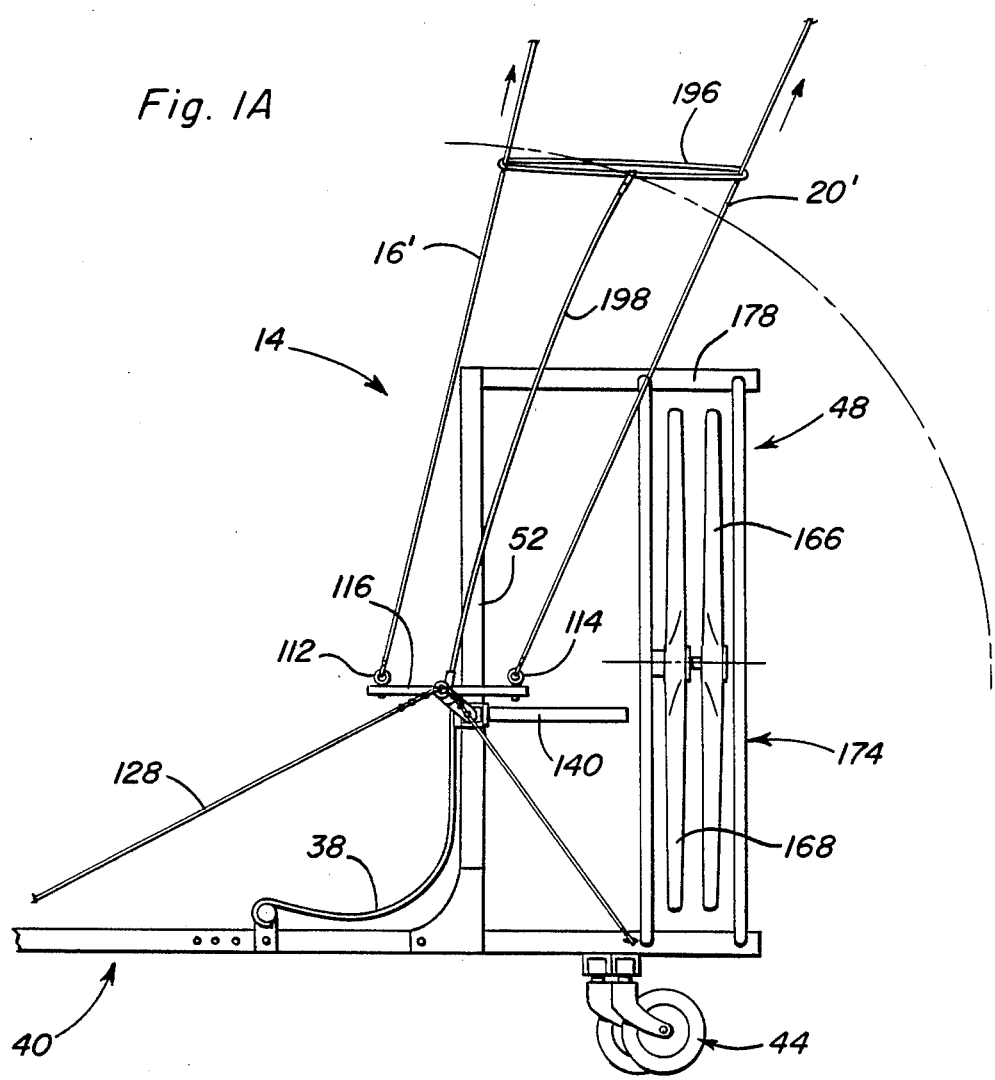
FIG. 1A is an enlarged partial side elevational view of a portion of the arrangement of FIG. 1, shown in greater detail.

Referring now to the drawings in detail, FIG. 1 generally illustrates an aircraft constructed in accordance with the present invention denoted by reference numeral 10, the aircraft being shown in flight. The aircraft consists of a flexible wing portion generally referred to by reference numeral 12 and a pilot supporting flight vehicle generally denoted by reference numeral 14. At least two groups of spanwise spaced load suspension lines interconnect the vehicle 14 with the leading edge portion 18 of the wing portion 12 while at least two groups of load lines 20 connect the vehicle 14 to the bottom surface 22 at locations intermediate the leading edge portion 18 and the trailing edge 24. Also extending from the flight vehicle 14 to the trailing edge 24 of the wing prtion are a pair of directional control lines 26.

As more clearly seen in FIG. 2, the flexbile wing portion 12 of the aircraft is a ram air inflated type of airfoil canopy made of a flexible fabric such as nylon. The canopy includes a top surface skin 28 that extends in a chordwise direction along an airfoil curvature from the leading edge portion 18 to the trailing edge 24 when in an inflated condition. The canopy is inflated by the inflow of air into a plurality of air cells 30 that extend chordwise and are separated by ribs 32. The foregoing type of ram air inflated canopy is generally well known in the art except for the particular locations at which the load lines 16 and 20 are connected thereto in chordwise spaced relationship in order to establish a certain critical geometrical relationship with the flight vehicle 14 as will be explained in detail hereinafter. Furthermore, the canopy at the leading edge portion 18 has an air intake face 34 forming the open ends of the canopy inflating cells 30. The air intake face 34 also forms part of the geometrical relationship aforementioned to enhance canopy inflation during the take-off phase of operation as will also be explained hereinafter in detail.

With continued reference to FIG. 1, the flight vehicle 14 as shown supports a single pilot 36 on a canvas seat 38 anchored to a vehicle frame assembly generally referred to by reference numeral 40. The frame assembly includes a forward, dirigible ground supporting wheel assembly 42 and a pair of rear swively mounted caster wheel assemblies 44 to form a 3-wheel ground support for the vehicle. A steering control assembly generally referred to by reference numeral 46 is mounted on the front end portion of the vehicle frame and serves to both effect ground steering and in-flight directional control of the canopy through the directional control lines 26 as will be explained hereinafter in detail. Mounted on the rear end portion of the vehicle frame is a forward thrust producing unit generally referred to by reference numeral 48. In addition to the steering control over the aircraft, the pilot 36 controls forward thrust for climb, level flight and descent purposes.

Figure 3:
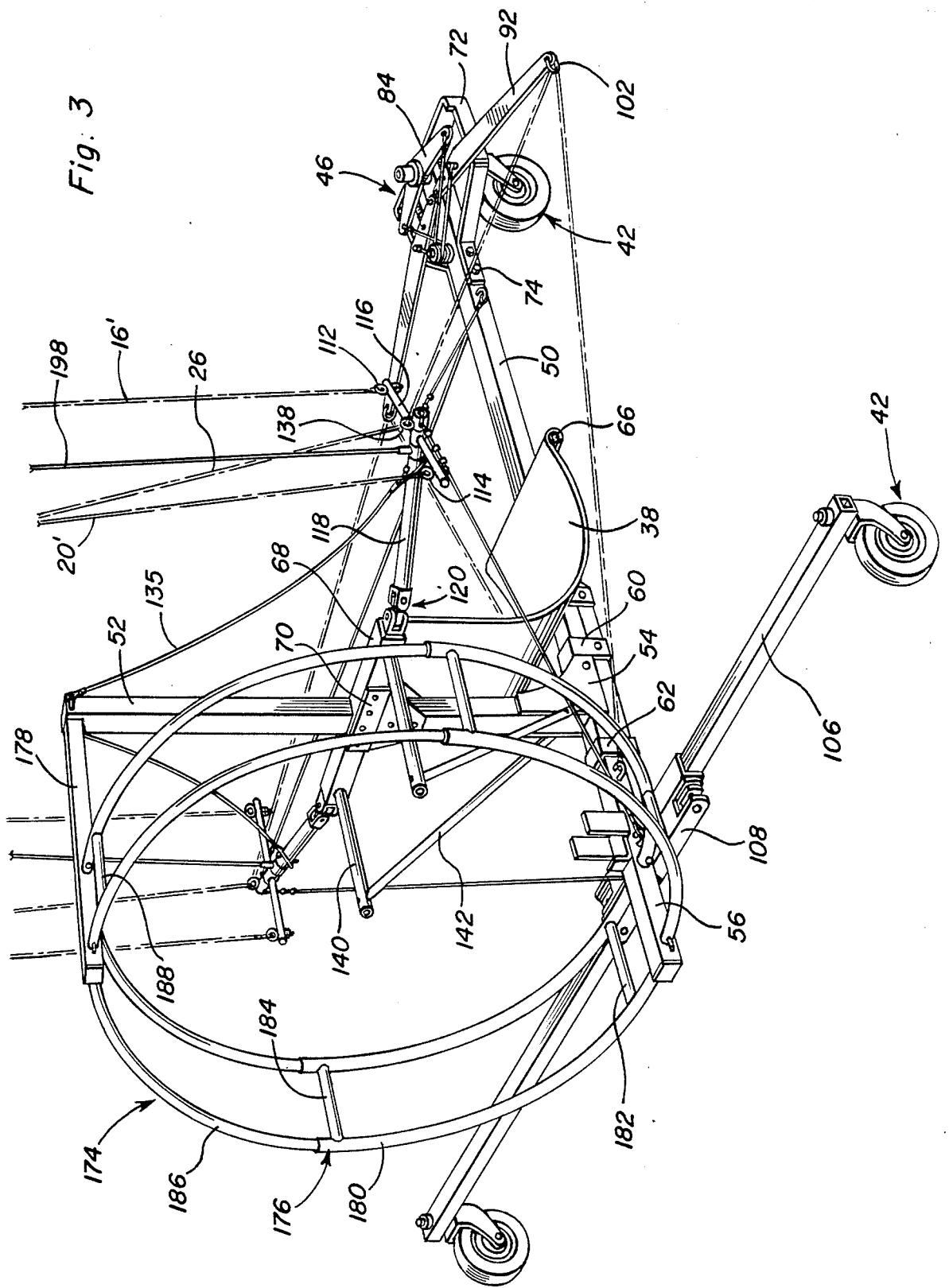
FIG. 3 is a rear end perspective view of the flight vehicle portion of the aircraft shown in FIG. 1.
Figure 8:
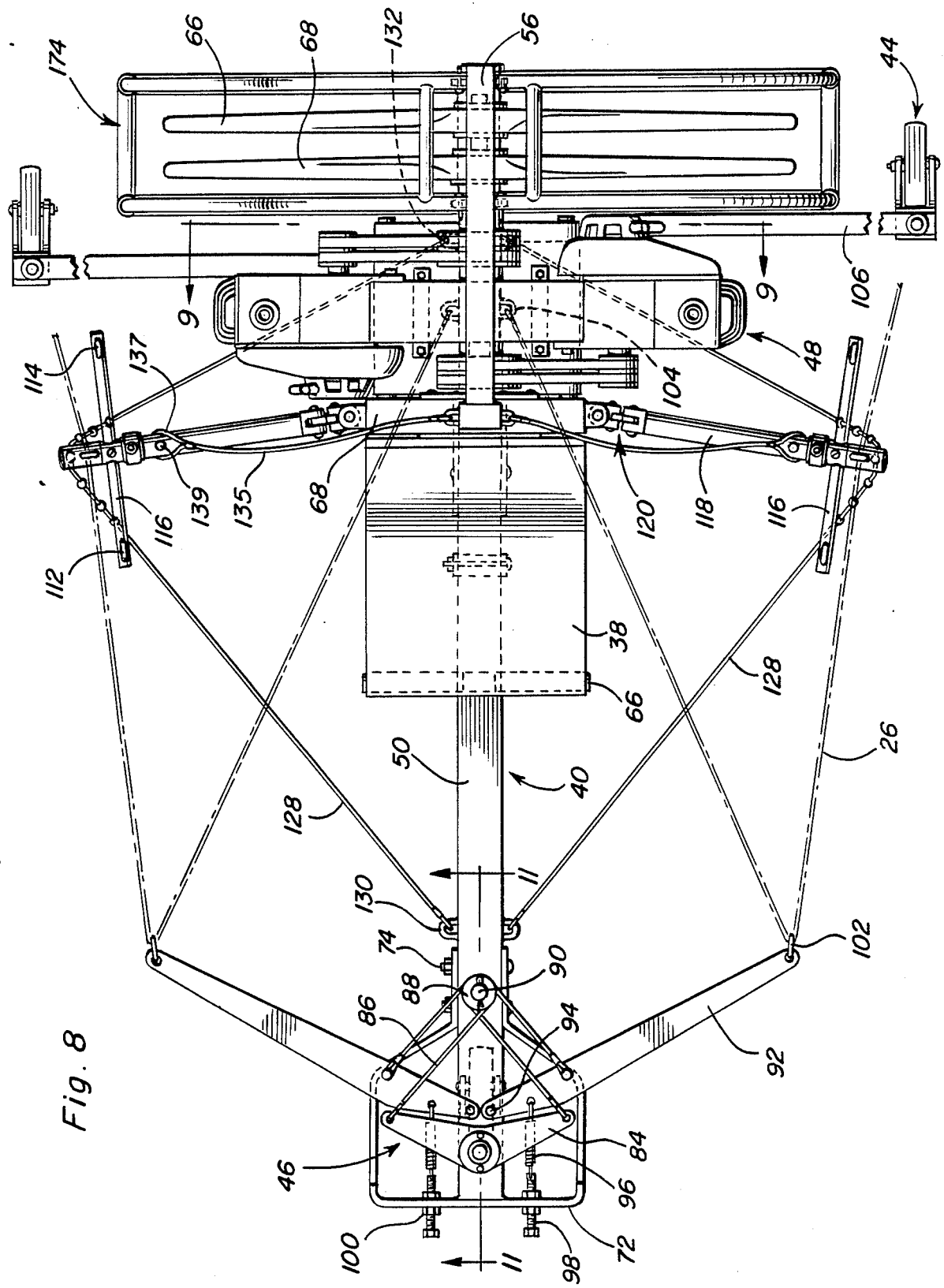
FIG. 8 is a top plan view of the flight vehicle shown in FIG. 7.

FIGS. 3, 7 and 8 illustrate in detail the vehicle frame assembly in an erected, air worthy condition. The frame assembly includes an elongated tubular frame member 50 having a front end portion on which the steering control assembly 46 is mounted. The other longitudinal end portion of the frame member 50 is pivotally connected to a tubular mast 52 by means of a pair of side gusset plates 54. The gusset plates are rigidly connected as by welding to a rearwardly extending, rear end tubular frame section 56. In the erected condition of the vehicle frame assembly, the rear end frame section 56 is longitudinally aligned with the frame member 50 as shown in FIGS. 3 and 7. The frame member 50 and rear end frame section 56 are locked in this aligned relationship by means of an underlying lock bar 58 that is slidably mounted on the frame member 50 by means of a pair of slide straps 60 fastened to the lock bar 58. The lock bar is slidably displaced in a rearward direction for reception through a loop strap 62 fastened to the rear end frame section 56. The lock bar when slidably displaced in a forward direction to the dotted line position shown in FIG. 7, permits folding of the frame sections 50 and 56 about the interconnecting pivot 64 as shown in FIG. 21. In order to accommodate such folding of the frame sections, the pilot supporting seat 38 is made of a flexible canvas material anchored at opposite ends to the forward frame member 50 by means of an adjustably positioned anchor bar 66 while the other end of the canvas seat member 38 is anchored to the mast 52 by means of a tubular cross bar member 68. The cross bar is rigidly connected to the mast by a pair of gusset plates 70 and extends laterally therefrom generally perpendicular to the common longitudinal axis of the frame sections 50 and 56 which are parallel to the longitudinal axis of the vehicle frame.

Figure 11:
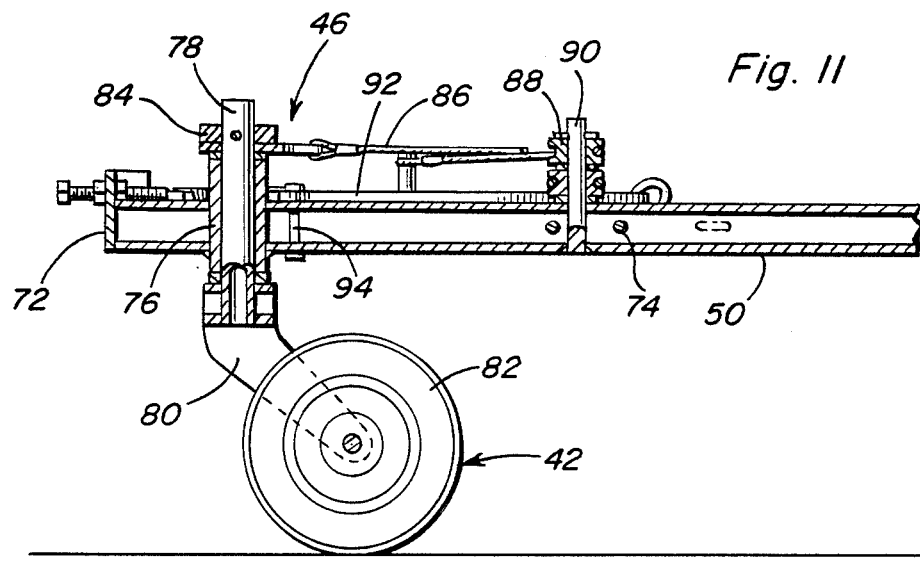
FIG. 11 is a partial section view taken substantially through a plane indicated by section line 11—11 in FIG. 8.

Referring now to FIGS. 8 and 11 in particular, the steering control assembly 46 at the front end portion of the vehicle frame includes a frame loop element 72 fixedly attached to the forward end of the frame member 50 as by welding and by fasteners 74 to the sides of the frame member 50 in rearward spaced relationship to the forward end. A tubular bearing sleeve 76 is fixed as by welding to the frame member 50 and extends vertically therethrough for rotationally supporting a steering shaft 78 to which the dirigible wheel assembly 42 is connected. Thus, the lower end of the steering shaft 78 is rigidly connected to a wheel mounting frame 80 which rotationally supports the front wheel 82 below the frame member 50. A pair of interconnected steering control arms 84 are rigidly connected to the upper end portion of the steering shaft 78 and extend laterally therefrom within the confines of the frame element 72 as more clearly seen in FIG. 8. The laterally outer ends of the steering control arms 84 have a pair of actuating cables 86 connected thereto. The cables 86 are entrained about a pair of pulleys 88 rotatably mounted on a pulley spindle 90 affixed to the frame member 50 in rearward spaced relationship to the steering shaft 78. The cables 86 entrained about the pulleys 88 extend therefrom forwardly for connection to a pair of steering control levers 92 which are pivotally mounted on the frame member 50 independently of each other by means of a pair of pivots 94. The steering control levers 92 extend at a rearwardly inclined angle to the frame member 50 beyond the frame element 72 and are spaced forwardly of the pilot supporting seat 38 a sufficient distance to comfortably support the feet of the pilot as shown in FIG. 1. Each of the steering control levers 92 is connected to one end of a coil spring 96. The other end of the coil spring 96 is connected to an adjustment screw element 98 threadedly mounted through nuts 100 fixed to the frame element 72 as more clearly seen in FIG. 8. The ends of the adjustment screws 98 are provided with knurled knobs or the like so that the tensions of the springs 96 may be adjusted in order to preset a centering bias on the wheel assembly 42 yieldably maintaining straight ahead travel on the ground. It will be apparent therefore that pivotal displacement of the control levers 92 by foot applied pressure will correspondently transmit displacing forces to the control arms 84 in order to angularly displace the steering shaft 78 of the dirigible wheel assembly 42 for ground steering purposes. The laterally outer ends of the control levers 92 mount guide rings 102 through which the directional control cables 26 extend to the trailing edge portions of the canopy 12. The directional control cables 26 are anchored to the vehicle frame by anchor elements 104 on opposite sides of the rear end frame section 56. Thus, the same pivotal movements imparted to the directional control levers 96 for effecting ground steering through the steering control arms 84 will also be operative through the directional control lines 26 to effect deflection of spanwise spaced portions of the trailing edge 24 of the canopy in order to control aerodynamic steering of the canopy and the aircraft while it is airborne.

Support for the vehicle frame assembly 40 on the ground is provided by the front dirigible wheel assembly 42 and the rear wheel assemblies 44 as aforementioned. Each of the rear wheel assemblies 44 is of a conventional caster wheel construction swivelly mounted at the end of a tubular leg member 106 as more clearly seen in FIGS. 3 and 8. The caster wheel assemblies 44 are threby mounted a substantial distance laterally of the elongated frame section 56 and are connected thereto by abutting, inverted channel-shaped members 108 secured as by welding to the underside of the rear end frame section 56 from which the channel-shaped members extend laterally a relatively short distance as compared to the leg elements 106. Pivot connections 110 are established at one of the ends of each of the channel-shaped members 108 on opposite sides of the rear end frame section 56 through which the leg elements 106 are connected to the channel-shaped members and pivotally displaced relative thereto from the extended positions shown in FIGS. 3, 8 and 19 to folded positions as shown by dotted line in FIGS. 20 and 22. Such pivotal displacement of the leg elements 106 from the extended to the folded positions involve approximately 270° rotation since each leg element 106 extends from the end of its channel-shaped member 108 opposite the end to which it is pivotally connected by pivotal connection 110. Adequate cantilever support for the leg elements in the extended positions is thereby provided by the channel-shaped members 108. In the extended positions of the leg elements 106, the caster wheel assemblies 44 will not only provide firm and stabilized support for the flight vehicle on the ground in combination with the front dirigible wheel assembly 42, but will also automatically respond to cross wind forces in changing the direction of forward movement of the flight vehicle into the direction of the prevailing winds. Canopy inflation during take-off is thereby assured.

Referring now to FIGS. 7, 8, 12 and 13 in particular, each pair of load lines 16 and 20 are pivotally connected through cables 16' and 20' to the vehicle by anchors 112 and 114 mounted in spaced relationship to each other adjacent opposite ends of an anchor arm 116. Two pairs of anchor arms 116 are positioned on opposite lateral sides of the longitudinal axis of the vehicle frame assembly by positioning lever elements 118 connected by double hinge assemblies 120 to the opposite ends of the cross bar member 68. Each double hinge assembly 120 as more clearly seen in FIGS. 12 and 13, establishes a vertical adjustment axis fixed to the vehicle frame assembly through pivot pin 122 about which a positioning lever element 118 is displaceable in a generally horizontal plane. A pivot pin 124 of the double hinge assembly fixed to the positioning element 118 establishes a second axis about which the positioning lever element 118 is displaceable in a generally vertical plane. Displacement of the positioning lever element 118 about the axis through pivot pin 124 occurs in response to aerodynamic lift forces exerted on the canopy and transmitted to the anchor arm 116 through the load lines 16 and 20. Upon displacement of the positioning lever elements 118 to limit positions in response to tensioning of the load lines thereby establishes operative positions for the anchor arms corresponding to the geometrical relationship between the flight vehicle 14 and the canopy 12. The operative position of the anchor arm 116 will also depend upon the adjusted angular position of the positioning lever element 118 about the adjustment axis through pivot pin 122. Selection of the longitudinal location of the anchor arm 116 in its operative position relative to the vehicle frame is effected through a locking arrangement on each lateral side of the vehicle frame, generally referred to by reference numeral 126 as more clearly seen in FIGS. 12 and 13.

Figure 14:
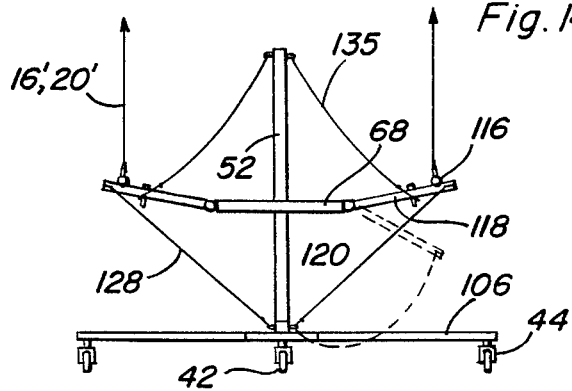
FIGS. 14, 15 and 16 are simplified end and top views of the flight vehicle showing the load line anchor positioning and locking actions associated with the structural arrangement of FIGS. 12 and 13.
Figure 15:
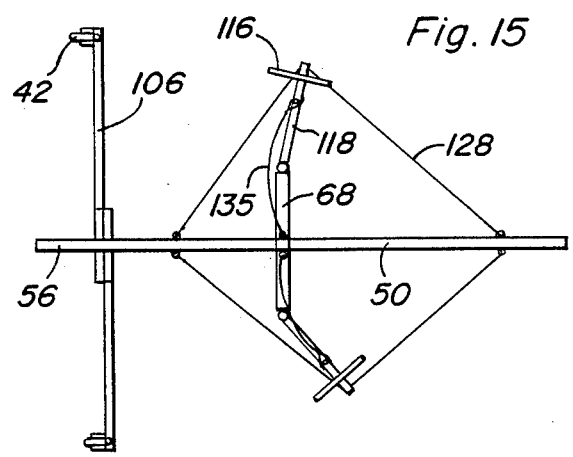
Figure 16:
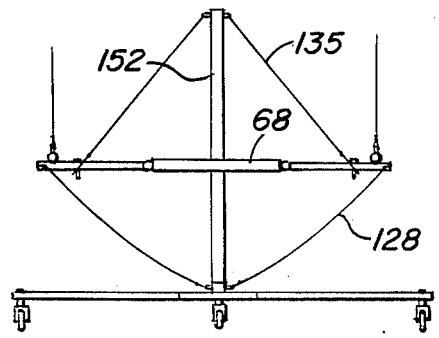

The adjustable locking mechanism 126 includes a loop cable 128 anchored at oPposite ends by anchors 130 and 132 to the forward frame member 50 and the rear end frame section 56 as more clearly seen in FIG. 8. Locking formations 134 with appropriate indicia formed thereon, such as color coding, are mounted in spaced relationship on the loop cable 128. The laterally outer end of each positioning lever element 118 has a slotted lock member 136 secured thereto adapted to receive one of the locking formations 134 therein as more clearly seen in FIG. 13. Accordingly, the positioning lever element 118 will be secured at a preselected location to the loop cable 128. Prior to flight, the loop cables 128 will be in a slack condition with the positioning lever elements 118 held elevated by cables 135 anchored to the top of mast 52. In such positions of the positioning elements 118, the loop ends 137 of the cables 135 slidable on the positioning elements are hooked onto retractable pins 139 as more clearly seen in FIG. 8. The cables 135 will then be taut as shown in FIG. 16. When the load lines 16 and 20 become tensioned as a result of aerodynamic lift exerted on the canopy 12, an upward pull is exerted by the load lines on the positioning lever elements 118 causing upward displacement thereof to the limit positions at which the loop cables 128 become taut and the cables 135 slacken as shown in FIG. 14. Depending upon the preselected location at which the loop cables 128 are locked to the ends of the positioning lever elements 118, the taut loop cables 128 will will predetermine the angular positions of the positioning lever elements 118 as shown in FIG. 15. Thus, the adjustable lock mechanisms 126 enable one to change the location of the vehicle center of gravity relative to the anchor arms 116 in accordance with the weight of the pilot. Such adjustment of the location of the center gravity of the flight vehicle load relative to the anchor points at which the canopy load lines are connected thereto was found necessary to maintain the optimum geometrical relationships for safe flight in accordance with the present invention.

Figure 9:
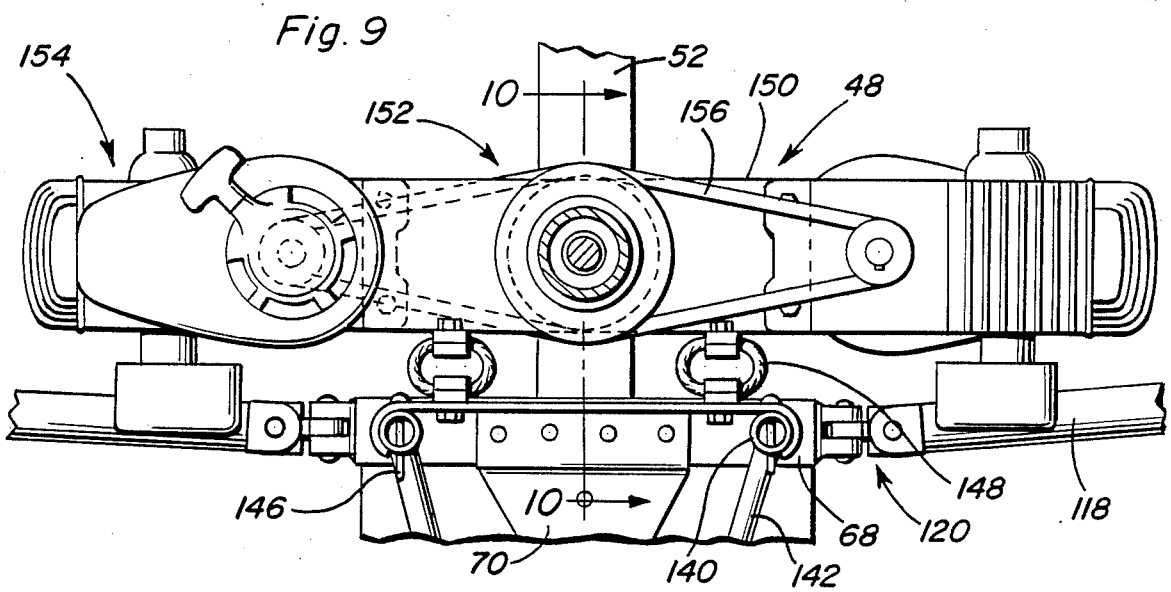
FIG. 9 is a partial end section view taken substantially through a plane indicated by section line 9—9 in FIG. 8.
Figure 10:
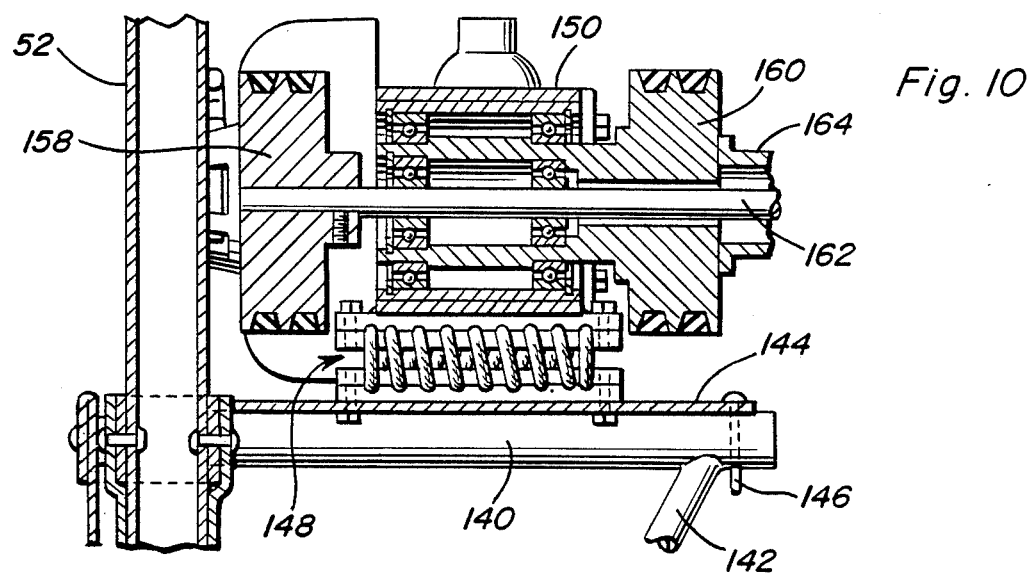
FIG. 10 is a partial section view taken substantially through a plane indicated by section line 10—10 in FIG. 9.
Figure 12:
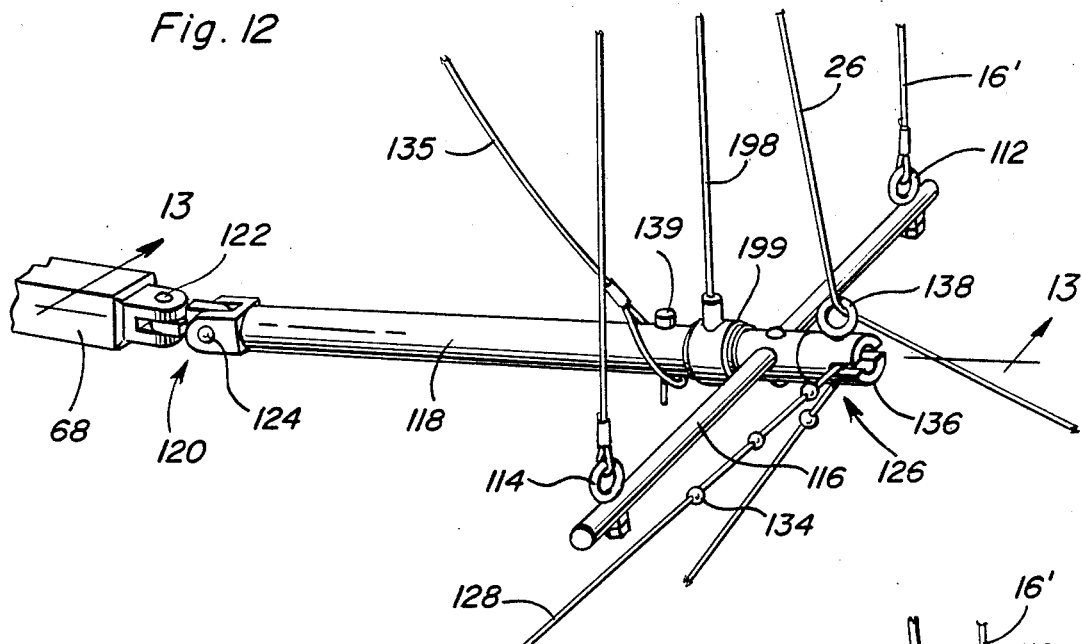
FIG. 12 is an enlarged partial perspective view of a load line anchor positioning and locking portion of the flight vehicle.
Figure 13:
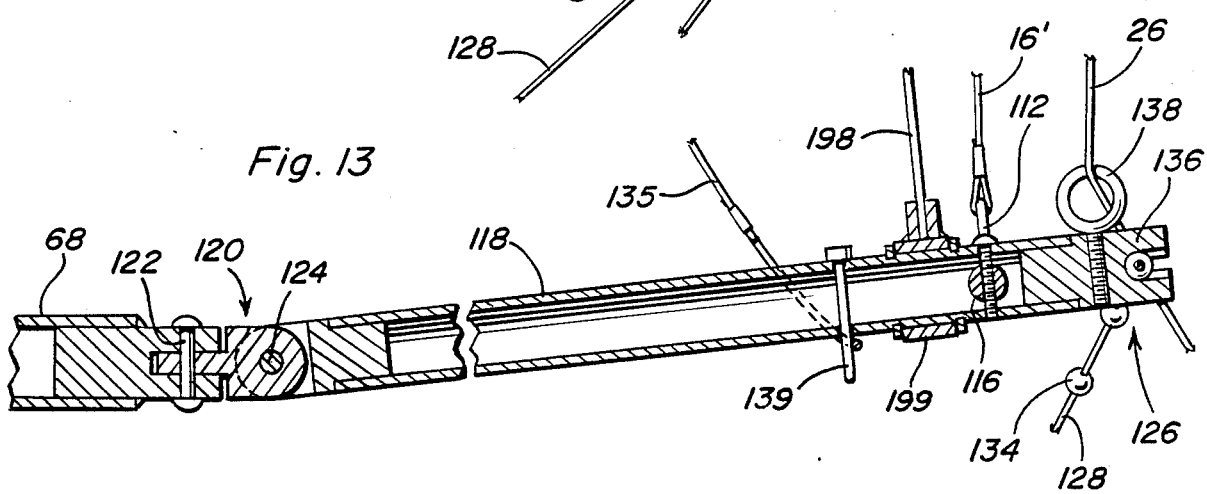
FIG. 13 is an enlarged sectional view taken substantially through a plane indicated by section line 13—13 in FIG. 12.

The locking members 136 associated with each of the adjustable locking mechanism 126, as more clearly seen in FIGS. 12, and 13, also mount a guide ring 138 through which the directional control lines 26 extend to the canopy from the steering control assembly 46. The guide ring 138 and the load line anchors 112 and 114 will all be disposed in adjusted positions laterally of the pilot with the pilot supporting seat 38 located on the front end frame member 50 forwardly of the mast 52 to which the cross bar 68 is connected for support of the anchor positioning and adjustable locking facilities. The forward thrust producing unit 48 aforementioned is mounted on the vehicle frame assembly rearwardly of the mast 52 by means of a pair of support bars 140 secured to and projecting from the cross bar 68 in parallel spaced relationship to each other on opposite sides of the longitudinal axis of the vehicle frame assembly. As more clearly seen in FIG. 3, the support bars are braced by rods 142 secured at their lower ends to the gusset plates 54 interconnecting the rear end frame section 56 and the mast 52. As more clearly seen in FIGS. 9 and 10, the forward thrust producing unit 48 is assemblied on a supporting platform 144 slidably received over the support bars 140 and locked thereto by locking elements 146. A pair of shock absorbers 148 mount a bearing block 150 associated with a transmission 152 drivingly connected to a pair of lightweight, internal combustion engines 154 of a commercially available type. Drive shafts extend from the internal combustion engines 154 in opposite directions parallel to the longitudinal axis of the vehicle frame assembly and are drivingly connected by endless pulley belts 156 of the transmission 152 to driven pulley wheels 158 and 160 rotatably mounted in coaxial relationship on the bearing block 150. The forward pulley wheel 158 is connected to a power shaft 162 that extends through a coaxial tubular power shaft 164 connected to the rearward pulley wheel 160 as more clearly seen in FIG. 10. The power shafts 162 and 164 are accordingly rotated in opposite rotational directions and are respectively connected to counter-rotating pusher propellers 166 and 168 disposed above the rear end portion of the rear end frame section 56 as more clearly seen in FIG. 7. The propellers 166 and 168 by virtue of their counter rotating relationship and connection to the coaxial pulleys 158 and 160 of the transmission 152, will balance side thrusts produced during powered rotation. Fuel for operating the two engines 154 is supplied from a fuel tank 170 mounted on the rear end frame section 56 below the supporting platform 144 and adjacent to the mast 52 forwardly of the rotating propellers 166 and 168 as more clearly seen in FIG. 7. Fuel tank holding hardware 172 may be provided on the rear end frame section 56 as more clearly seen in FIG. 19.

Figure 17:
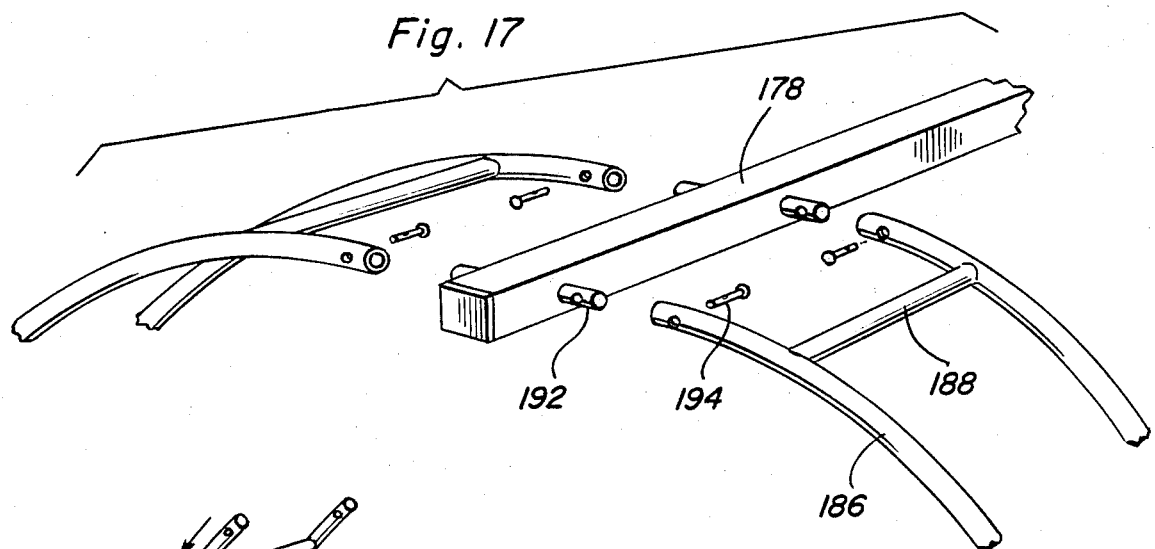
FIG. 17 is a perspective view of disassembled portions of the propeller guard associated with the flight vehicle shown in FIGS. 1, 3, 7 and 8.
Figure 18:
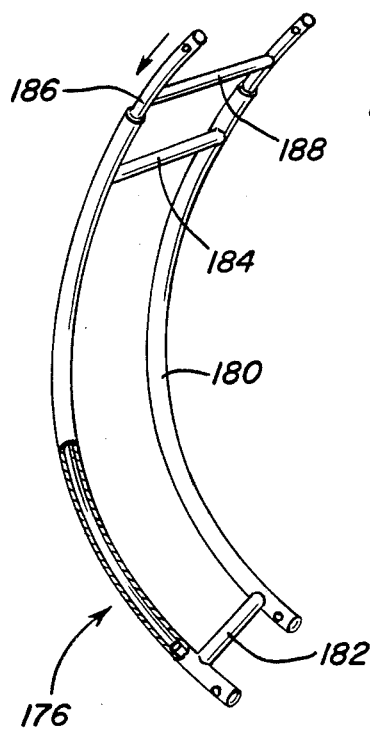
FIG. 18 is a perspective view of a collapsed section of the propeller guard.
Figure 19:
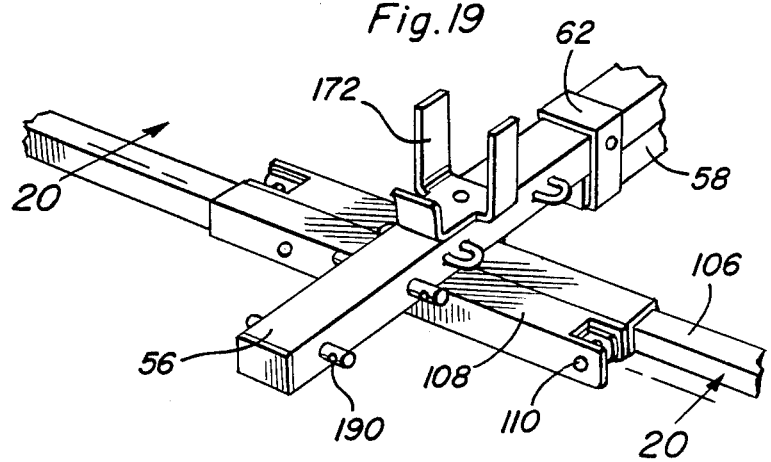
FIG. 19 is a partial perspective view of a rear end frame section of the flight vehicle.
Figure 20:
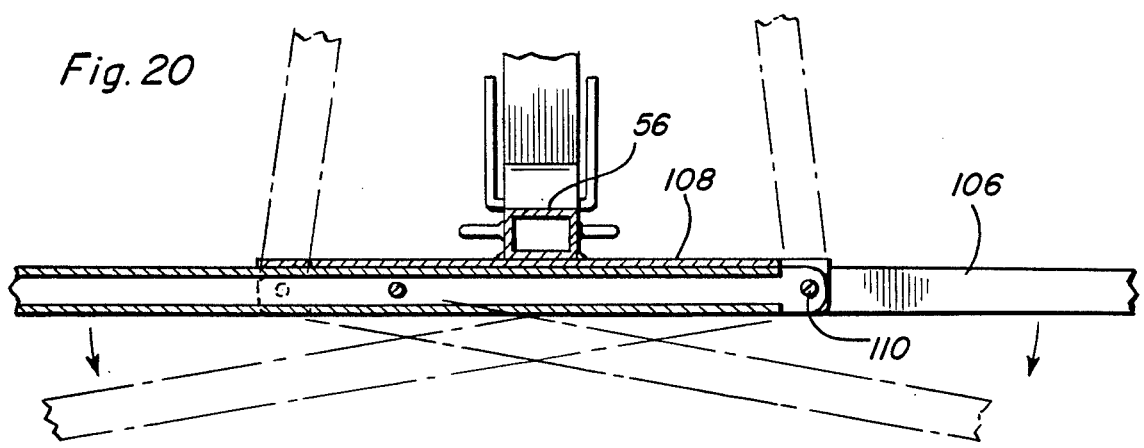
FIG. 20 is a partial sectional view taken substantially through a plane indicated by section line 20—20 in FIG. 19.

Referring now to FIGS. 3, 17 and 128 in particular, an open frame type of propeller guard generally referred to by reference numeral 174 is provided. The propeller guard includes two generally semi-circular sections 176 that are extended from collapsible condition for assembly onto the vehicle frame through the rear end frame section 56 and a parallel upper support bar 178 rigidly fastened to and extending rearwardly from the upper end of the mast 52. Each section 176 of the propeller guard includes a pair of arcuate-shaped, outer tubular rods 180 interconnected adjacent opposite ends by connecting bars 182 and 184. Parallel spaced, inner arcuate rods 186 interconnected by connecting bars 188 are extended from retracted positions as shown in FIG. 18 to the extended positions as shown in FIG. 3 in order to accommodate assembly of the propeller guard onto the vehicle frame. The open lower ends of the outer tubular bars 180 are plugged onto pins 190 projecting from opposite sides of the rear end frame section 56 as shown in FIG. 19 whereas the open upper ends of the inner bars 186 are plugged onto pins projecting from the opposite sides of the support bar 178 as shown in FIG. 17. When so assembled, removable fasteners 194 lock the arcuate bars 180 and 186 to the pins 190 and 192 in order to complete a rigid, open framework type of propeller guard assembly.

Figure 4:
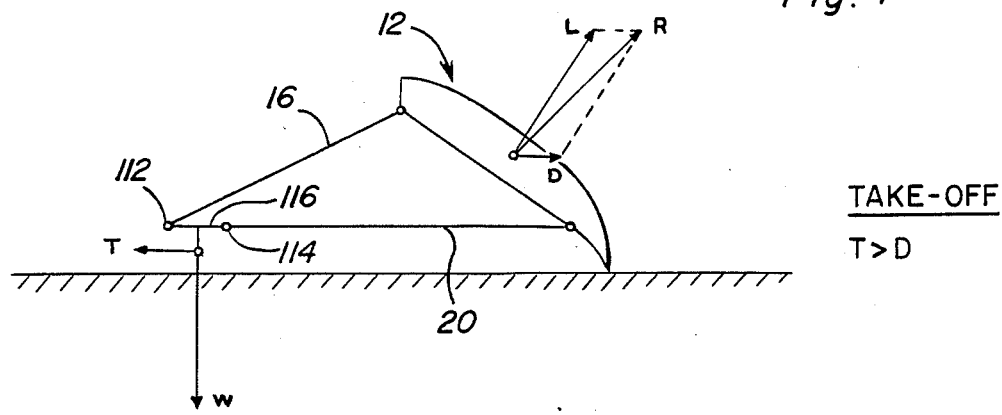

It will be apparent from the foregoing description that pilot operated throttle controls are associated with the engines 154 of the forward thrust producing unit 48 so that the forward thrust exerted by the unit 148 on the flight vehicle 14 may be regulated, such forward thrust being represented by thrust vectors T extending forwardly from the vehicle center of gravity as shown in FIGS. 4, 5, 5A and 6. The forward thrust will accordingly accelerate the flight vehicle 14 to a constant cruising speed V from the take-off attitude of the canopy having an angle of attack determined by the relative lengths of the load line connections between the canopy and the vehicle frame. Thus, in order to launch the aircraft, the unfolded canopy need only be raised from the ground by assisting personnel to an elevated position approximating the take-off attitude as shown in FIG. 4.

As more clearly seen in FIG. 1A, the cable connections 16' and 20' between anchors on arm 116 and the canopy extend through guide loops 196 secured to the outer ends of flexible rods or poles 198. The rods 198 are mounted for angular displacement on the positioning elements 118 adjacent to the anchor arms 116 by swivel collars 199 as more clearly seen in FIG. 13. Thus, the canopy load lines when slackened are maintained clear of the propellers since the travel arc of the guide loops 196 at the ends of rods 198 are well beyond the propeller guard 174.

Figure 6:
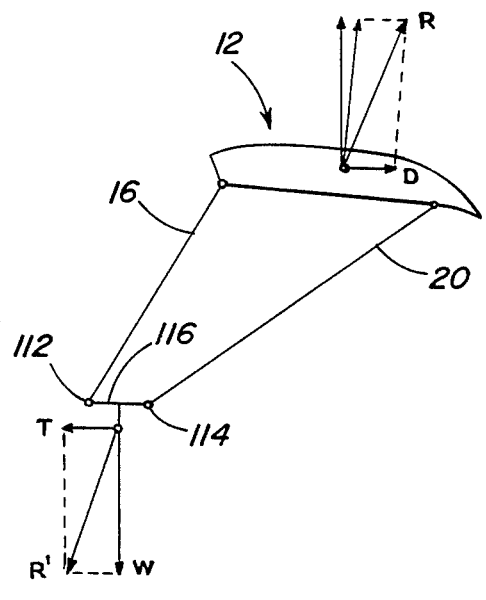
FIGS. 4, 5, 5A and 6 are schematic side views and vector diagrams associated with the aircraft of FIG. 1 during take-off, climb, descent, and level flight phases of operation.

Operation of the thrust producing unit 48 on the flight vehicle will forwardly accelerate the wheeled flight vehicle on the ground to cause immediate inflation of the canopy in its take-off attitude as shown in FIG. 4, from which the canopy is pivotally displaced relative to the forwardly moving vehicle as it begins its climb. Forward movement of the aircraft produces a predetermined lift drag ratio of approximately 3:1 on the airfoil canopy represented by the lift vectors L and drag vectors D. During take-off operation, the lift vector L is relatively high because of the high angle of attack position of the canopy in the take-off attitude with a correspondingly high drag vector D. The aerodynamic resultant force R on the canopy during the take-off phase will accordingly cause pivotal displacement of the canopy toward the climb attitude shown in FIG. 5, since the thrust vector T is greater than the drag vector D. As the lift vector rotates toward the vertical in response to the angular change in attitude of the canopy relative to the ground, the vertical lift component $L_v$ is maintained greater than that of the load vector W extending downwardly from the vehicle outer of gravity or load center as the magnitude of the thrust vector T approaches that of the drag vector D. The canopy assumes a steady state, level flight attitude as shown on FIG. 6 when both the drag vector D and the vertical lift component $L_v$ are equal in magnitude to the forward thrust vector T and the load vector W, respectively. Level flight is sustained by forward movement at the constant forward cruising speed under control of the balancing thrust T so as to maintain the force resultants R and R' equal as shown in FIG. 6.

Figure 5:
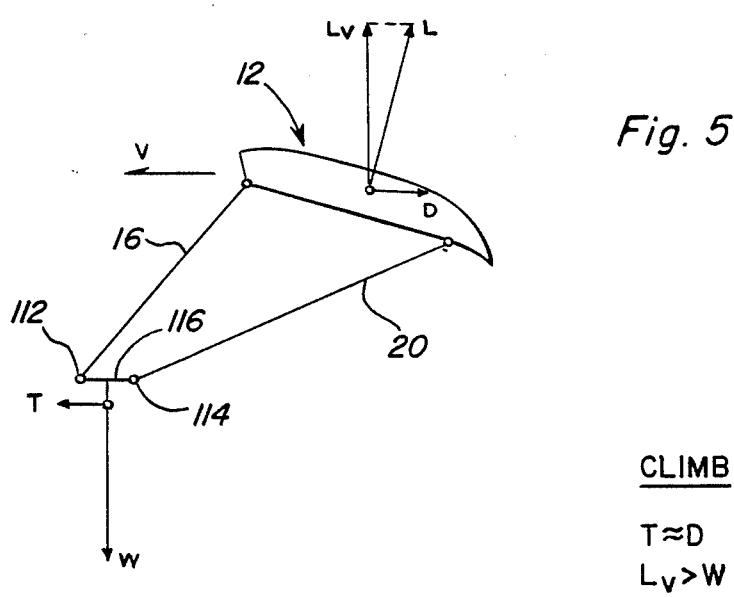
Figure 5A:
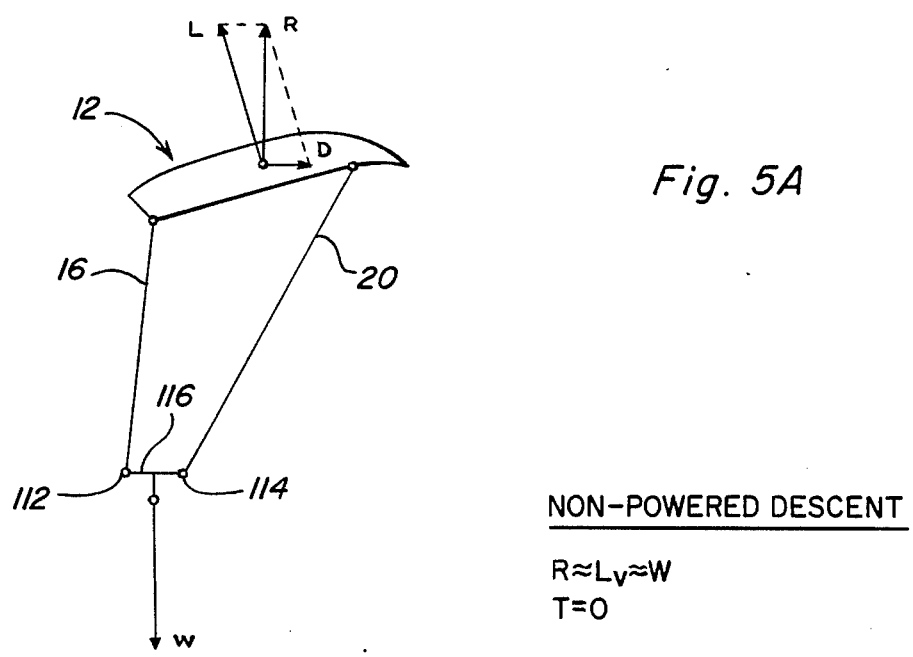

FIG. 4A shows the glide attitude of canopy 12 during non-powered descent wherein the thrust is equal to zero and the aerodynamic resultant R of the lift vector and drag vector D is vertical and equal in magnitude to the load vector W. Thus, a safe rate of descent may be obtained by reducing thrust from the level flight magnitude depicted in FIG. 6 toward zero. Any increase or decrease in thrust from such level flight magnitude will cause a corresponding change in canopy attitude toward positions respectively shown in FIGS. 5 and 5A without changing the forward cruising speed because of the geometrical relationships described including the shorter load line connection from anchor point 112 to the leading edge of the canopy, the longer load line connection from the anchor point 114 to the canopy at a location rearwardly spaced from the leading edge, the longitudinal spacing of anchor arm 116 between the anchor points and the adjusted location of the load center of the vehicle relative to (below) the anchor arm 116 as shown in FIG. 5.

Figure 22:
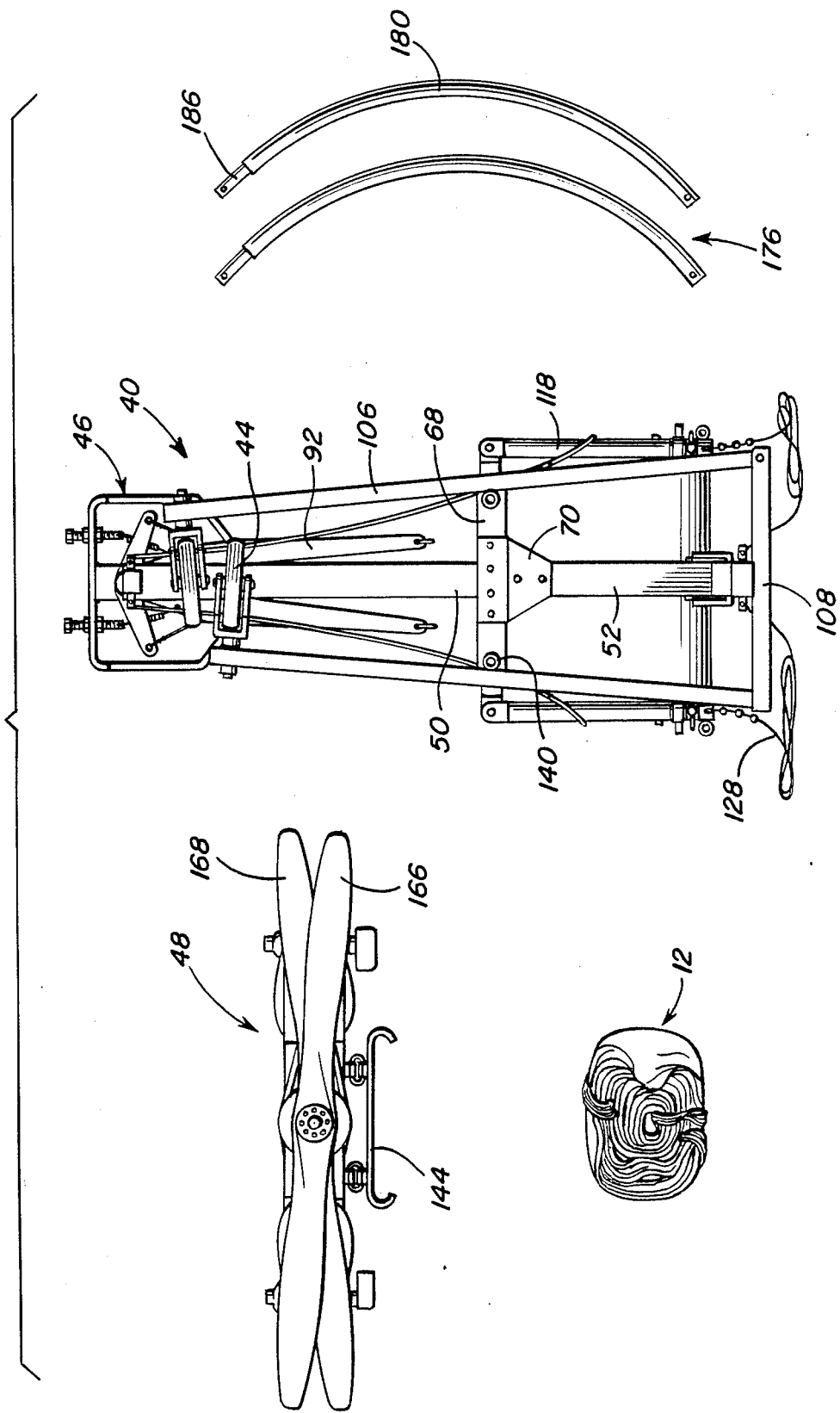
FIG. 22 is an elevation view of the disassembled and folded or collapsed portions of the aircraft.

It will be apparent that the type of aircraft hereinbefore described is more readily reduced in overall size for storage purposes because of the collapsible nature of the flexible airfoil wing or canopy 12. Further, the vehicle frame assembly is by virtue of the described construction foldable and collapsible to yet a further reduced storage size. FIG. 22 illustrates various portions of the aircraft disassembled from each other. The canopy 12 is shown collapsed and folded up as in the case of the usual parachute canopy while the forward thrust producing unit 48 is shown disassembled from the vehicle frame assembly. Also, the two sections 176 of the propeller guard are shown disassembled from the vehicle frame assembly. The vehicle frame assembly 40 itself is collapsed to a compact form by folding of the frame member 50 into close parallel spaced relationship to the rear frame section 52 with the retracted anchor positioning elements 118 pivotally suspended from the cross bar 68. Also folded by more than 180° from the extended positions, are the leg elements 106 on which the rear wheel assemblies 44 are carried. In such folded positions, the leg elements 106 abut the support bars 140 projecting from the cross bar 68 so as to position the rear caster wheel assemblies 44 in close spaced relationship to each other. One of the leg elements 106 will therefore be shorter than the other. It will be apparent that with such portions of the aircraft disassembled, collapsed or folded, the aircraft may be stored in a very compact form for transport to any launching site. At the launching site, the vehicle frame assembly 40 is erected as hereinbefore described, the forward thrust producing unit 48 assembled onto the erected frame assembly and the propeller guard extended and mounted. The canopy 12 may then be unfolded, placed on the ground in trailing relationship to the erected vehicle frame assembly, the load lines attached to the anchor points 112 and 114 and the directional control lines 26 attached to the steering control levers 92 for aircraft launching and take-off.

It will also be apparent to those skilled in the art that alternatives from the preferred embodiments as aforedescribed can be designed and constructed in accordance with the present invention. As evident from the foregoing, a principal feature of the instant invention is the directional self-stabilization of the canopy aircraft by reason of the counter-rotating pusher propellers 166 and 168. By employing a pair of counter-rotating propellers operated at the same speed by a single throttle, the torque normally induced in prior vehicles of this type using a single engine and propeller thrust system is eliminated. The torque from a single propeller produces a rolling moment, and thus a continuous turning force, in the aircraft. According to the embodiment of the present invention as hereinbefore described this rolling moment, and resultant continuous turning force, are eliminated by the counter-rotating propellers. As a result, it is not necessary in the foregoing embodiments of the present invention to include one or more rudders or other flight directional elements to compensate for the torque induced by a single rotating propeller.

Figure 23:
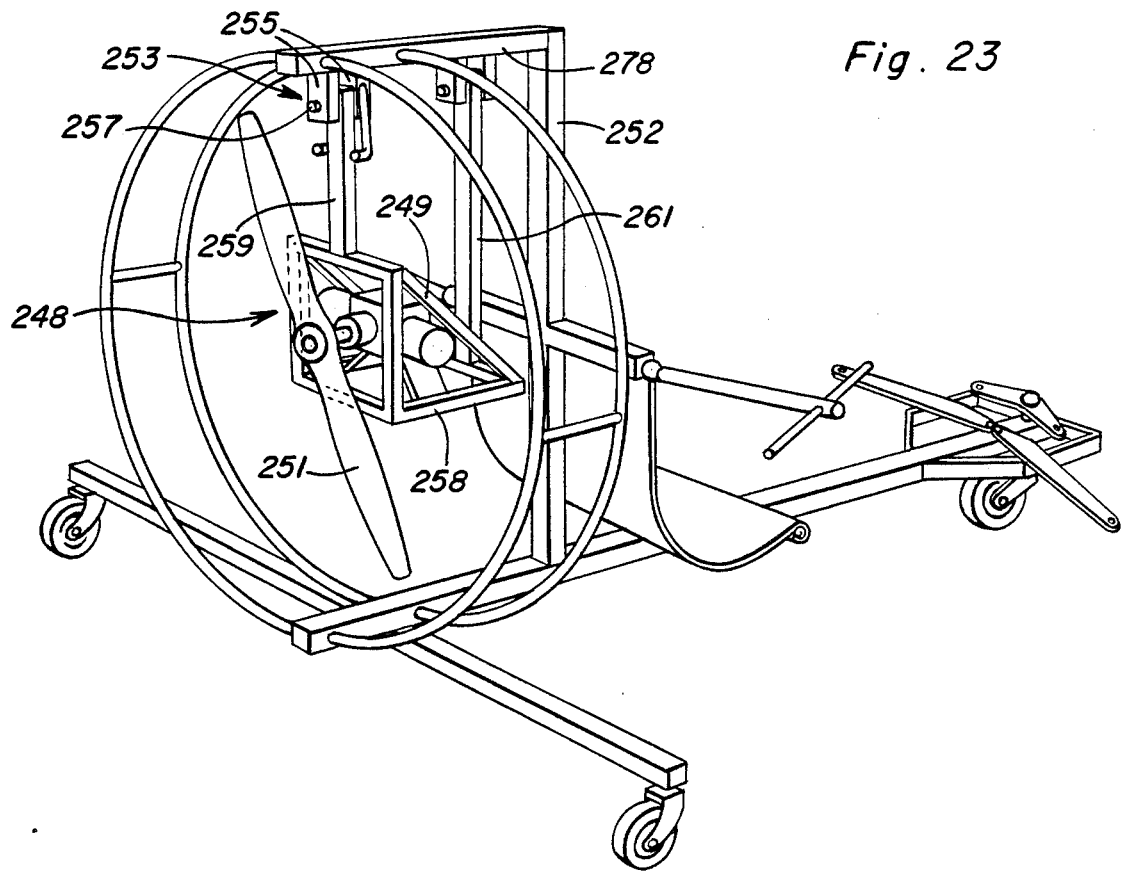
FIG. 23 is a rear end partial perspective view of the flight vehicle portion of the aircraft of the present invention employing a modified forward thrust producing unit and support assembly.
Figure 24:
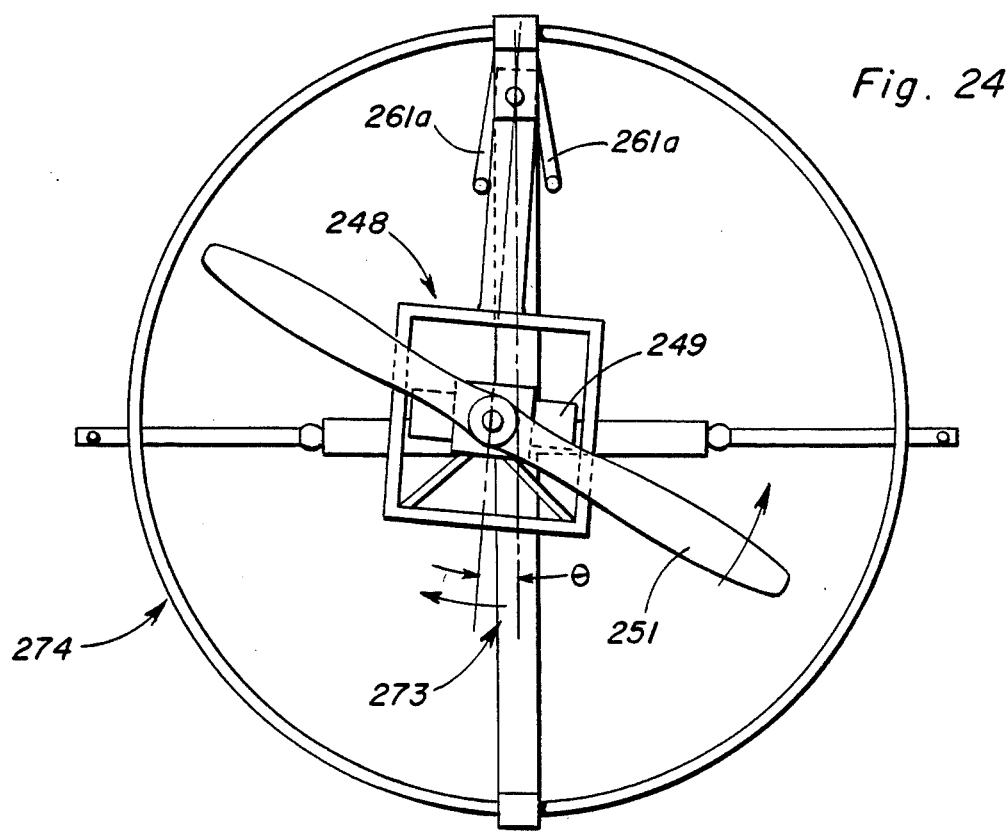
FIG. 24 is a partial rear end view of the modified flight vehicle shown in FIG. 23.

On the other hand, a single engine and pusher propeller can be employed in the present invention if an appropriate torque compensating mechanism is employed. One such self-compensating mechanism is shown in FIGS. 23 and 24. Forward thrust producing unit 248 comprises a single engine 249 and single propeller 251. Unit 248 is pivotally suspended on the vehicle frame assembly rearwardly of mast 252 from upper support bar 278 by a pivot support structure 253. Rigidly attached to upper support bar 278 are two pairs of tabs or brackets 255 each of which support removable longitudinal pins 257. Pivotally supported on pins 257 are thrust unit support arms 259 and 261 which are rigidly connected to frame 258 supporting the engine assembly 249 and pusher propeller 251. As shown in FIG. 24, a counter-clockwise rotating propeller (when viewed from the rear) produces an opposite rotating moment on the vehicle. This torque force induced by pusher propeller 262 is automatically self-compensated by a slight pivot of the forward thrust assembly 248 off from the vertical axis, as shown at 263. Such pivoting action produces an opposite and offsetting moment to the vehicle which self-compensates for the propeller torque. Thus, during normal straight forward flight, unit 248 will be slightly pivoted off center. In a vehicle of this type, the pivoted deviation should be a reasonably small angular displacement depending upon the engine assembly. Stop lugs 261 are provided to prevent inadvertent excess pivot of the thrust unit 248 which might cause engagement of the propeller with guard 274.

Figure 25:
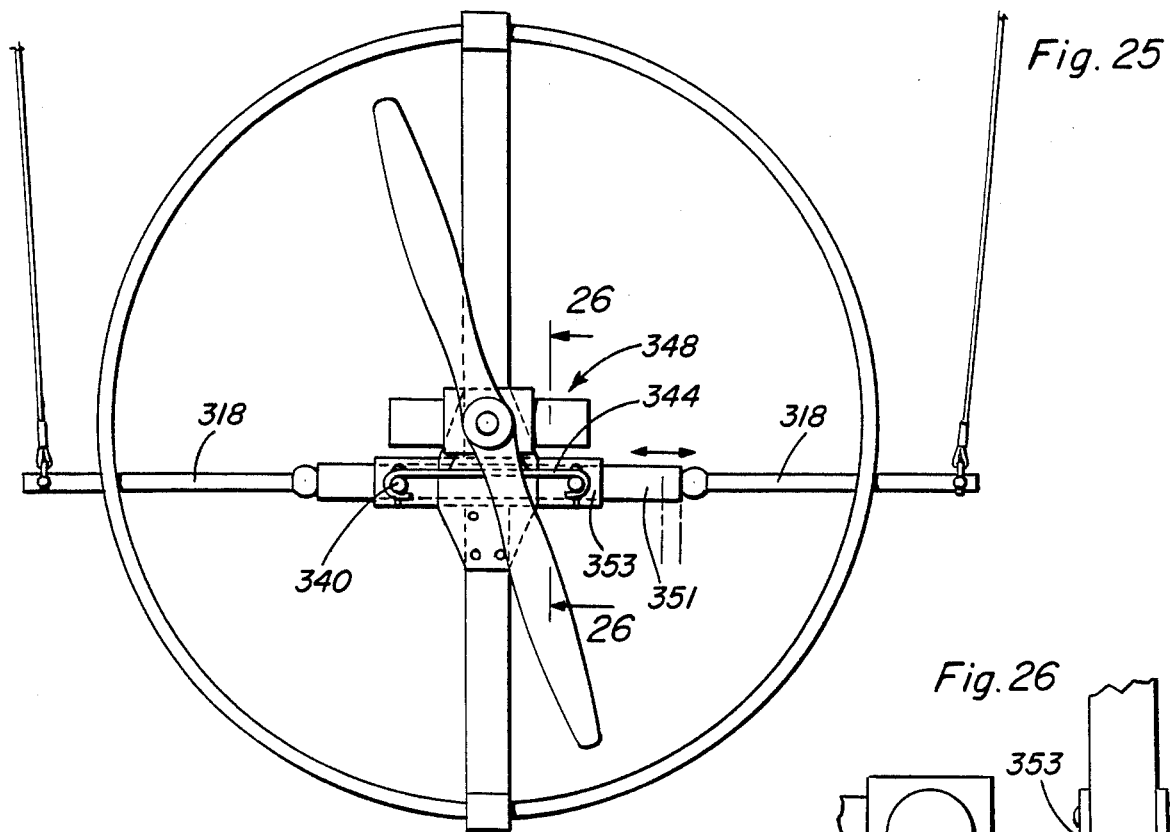
FIG. 25 is a partial rear end view of another modified flight vehicle for the aircraft of the present invention employing a single motor, single propeller forward thrust producing unit, and a mechanism for laterally shifting the center of gravity of the aircraft.
Figure 26:
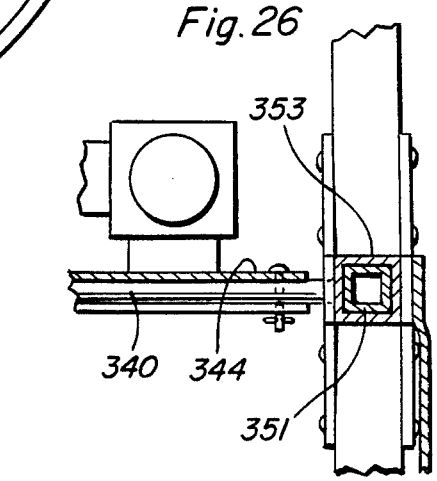
FIG. 26 is an enlarged sectional view taken substantially through a plane indicated by section line 26—26 in FIG. 25.

Torque compensation using a single engine and pusher propeller in accordance with the present invention can be accomplished in combination with a unique steering mechanism by the modified structure shown in FIGS. 25 and 26. As shown, forward thrust producing unit 348 comprises a single engine and pusher propeller mounted on supporting platform 344 and support bars 340 in the same manner as the foregoing embodiments (see FIGS. 3, 9 and 10). However, instead of mounting lever arms 118 on bar member 68 (see FIG. 3,) this modified construction mounts lever arms 318 on the ends of a laterally slidable horizontal support tube 351 which is slidably received in tubular sleeve 353. Sleeve 353 is then rigidly mounted with respect to mast 352. Connected between support tube 351 and sleeve 353 is a pilot operated mechanical linkage (not shown) by which the pilot can continuously control the lateral position of tube 351 within sleeve 353, such as by a hand lever control. In neutral position for straight forward flight, the tube 351 will be slightly off-center which shifts the center of gravity of the vehicle with respect to the supporting canopy in a direction to compensate for the torque moment created by rotation of the single propeller.

As will be apparent to those skilled in the art, this construction can be used to steer the aircraft. A further lateral shift of the vehicle center of gravity (to the left, shown in FIG. 25) by the pilot actuating the hand control lever to the left to shift tube 351 to the right within sleeve 353 will induce a turn in the direction of the weight shift. In other words, for example, a leftward movement from neutral of the hand lever produces a corresponding rightward lateral shift of the canopy with respect to the longitudinal axis of the vehicle, shifting the center of gravity of the aircraft to the left. This center of gravity shift will necessarily result in a left turning moment. Once the turn is complete, the pilot returns the lever to neutral, thus returning the supporting tube 351 relative to sleeve 353 to the established torque compensating center of gravity position for straight flight.

By employing this turning mechanism, it is no longer necessary to employ the directional control lines 26, and their related hardware, such as anchors 138 and 102, to turn the vehicle by controlling the trailing edge 24 of the flexible wing 12. Instead, the shape of flexible wing 12 remains unaltered during flight and turning of the vehicle is accomplished by merely altering the center of gravity by laterally shifting the vehicle with respect to horizontal support tube 351 and the canopy.

As apparent from the preceding paragraphs, the center of gravity shift steering mechanism of the type described with respect to FIGS. 25 and 26 can also be used with the dual motor, counter-rotating pusher propeller construction of the preferred embodiments. In this form of the invention, the center of gravity shift mechanism is not necessary for torque compensation but is employed solely for steering purposes. In this arrangement, the complete vehicle frame and forward thrust-producing unit would be on longitudinal center when the vehicle is flying straight forward. In order to induce a left or right turn, the steering lever control would be moved to slide horizontal support tube unit left or right so as to shift the center of gravity, thus producing an unbalanced lateral force on the canopy which produces a resulting left or right turn.

A further alternative in the dual engine, counter-rotating pusher propeller arrangement in accordance with the present invention contemplates separate throttle control of the two engines by employing, for example, a dual lever system. By separate throttle controls, the pilot can control the relative speed of the two engines, and therefore the relative speed of the counter-rotating propellers. When operating the engines at different speeds, the propellers will also rotate at different speeds, producing different torque moments. This torque differential can then be utilized to produce desired vehicle turning. In other words, when a left turn is desired, the pilot increases the power to the motor rotating the propeller which induces a left torque on the vehicle (or reduces the power to the other motor). When the turn is complete, the throttles are brought together, so that the speeds of the propellers are brought into conformity. This arrangement also eliminates the need for steering the vehicle through control of the canopy edge 24, and direction control lines 26 together with their related hardware can be eliminated.

Figure 27:
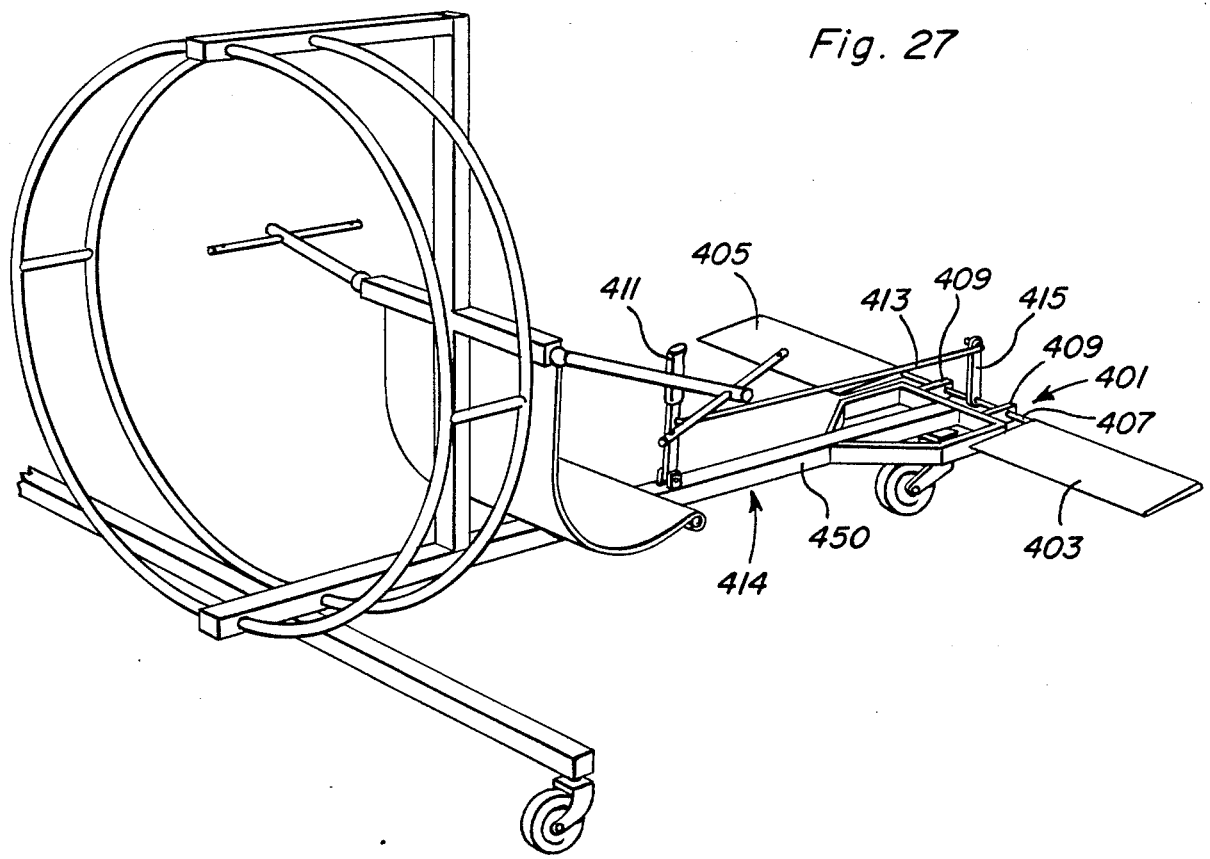
FIG. 27 is a partial rear end perspective view of another modified flight vehicle for the aircraft of the present invention employing canard surfaces.

A further modification of the present invention is shown in FIG. 27 where canard control surfaces 401 are mounted on the front of the vehicle 414 in the form of paddles 403 and 405, or the like. These paddles, or canard surfaces, control the pitch attitude of the frame and consequently the supporting canopy. As shown, paddles 403 and 405 are rigidly mounted on the ends of pivot rod 407 which is pivotly supported on two tabs or lugs 409 which are mounted on and extend forwardly of the front of the vehicle. The pitch of the canard surfaces can be controlled by a hand lever 411 pivotally mounted on main frame member 450. Pivotally connected to lever 411 is lever linkage 413 which controls the position of pivot rod arm 415. By pushing lever 411 forward the pilot pivots the paddles into a leading edge downward direction, and rearward movement of lever 411 pivots the paddles to an upward position. By employing canard control surfaces 401 in accordance with the present invention, the forward speed of the vehicle is no longer substantially uniform as in the preferred embodiments. Instead, the use of the canard surfaces allows the forward speed of the vehicle to be controlled and enhanced. As described in connection with the previous embodiments, increasing the thrust essentially increases only the climb of the vehicle but does not necessarily alter the forward speed. With the canard surfaces, increased thrust can be translated into increased forward speed by adjusting paddles 403 and 405 to pitch downwardly to prevent the vehicle from climbing. Similarly, by adjusting the paddles 403 and 405 to have their leading edge pitched upwardly, the ability of the vehicle to climb can be enhanced. Although not shown, a vertical canard rudder could also be mounted in the front of the vehicle to aid in lateral control.

In the form of the invention of FIG. 27, it is preferred that the paddles 403 and 405 be controlled together, such as by the single control stick or lever 411 so that they will both always have the same pitch. In this construction, the canard control surface serves to control the forward speed of the vehicle and aid in climbing. However, for more sophisticated flight, the paddles 403 and 405 can be separately mounted and separately controlled as by separate side-by-side levers and control linkages. By adjusting the relative pitch between the paddles, a rolling pitch can be produced to effect left and right turns and steering of the vehicle flight.

Figure 28:
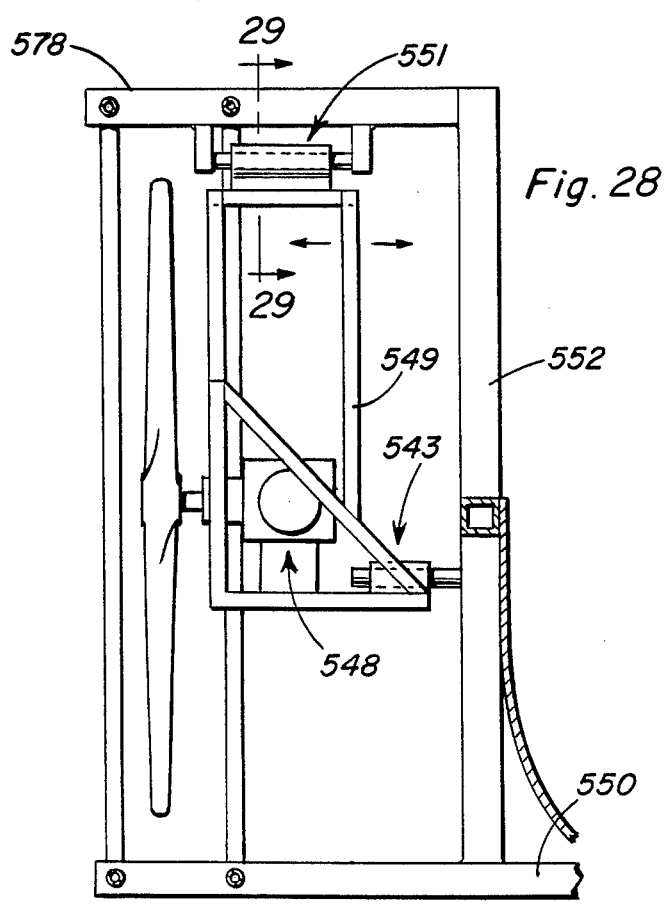
FIG. 28 is a side sectional view of the rear portion of the flight vehicle illustrating a further modified assembly for supporting a single motor, single propeller thrust producing unit.
Figure 29:
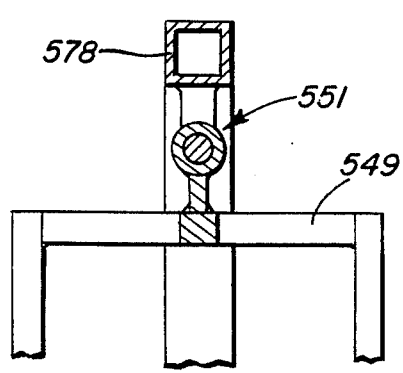
FIG. 29 is an enlarged sectional view taken substantially through a plane indicated by section line 29—29 in FIG. 28.

In addition to the foregoing alternatives, the forward speed of the vehicle of this invention can be controlled by shifting the center of gravity of the vehicle longitudinally. For example, as shown in FIGS. 28 and 29, the forward thrust producing unit 548 and motor frame 549 can be mounted to permit controlled longitudinal shifting by a mechanism operated by the pilot. Engine frame 549 and thrust unit 548 are suspended at the top from support arm 578 through a tube and sleeve assembly 551. The bottom of frame 549 is stabilized by guide 543 which is slidably connected to mast 552. A forward shift of the motor frame and thrust unit would move the center of gravity of the vehicle forward thus causing the vehicle to go faster. A rearward shift of the center of gravity will cause the vehicle to go slower. Alternative longitudinal center of gravity shifting systems can include pilot seat shifting as well as separate sliding weight elements, such as might slide on longitudinal frame member 550.

Figure 30:
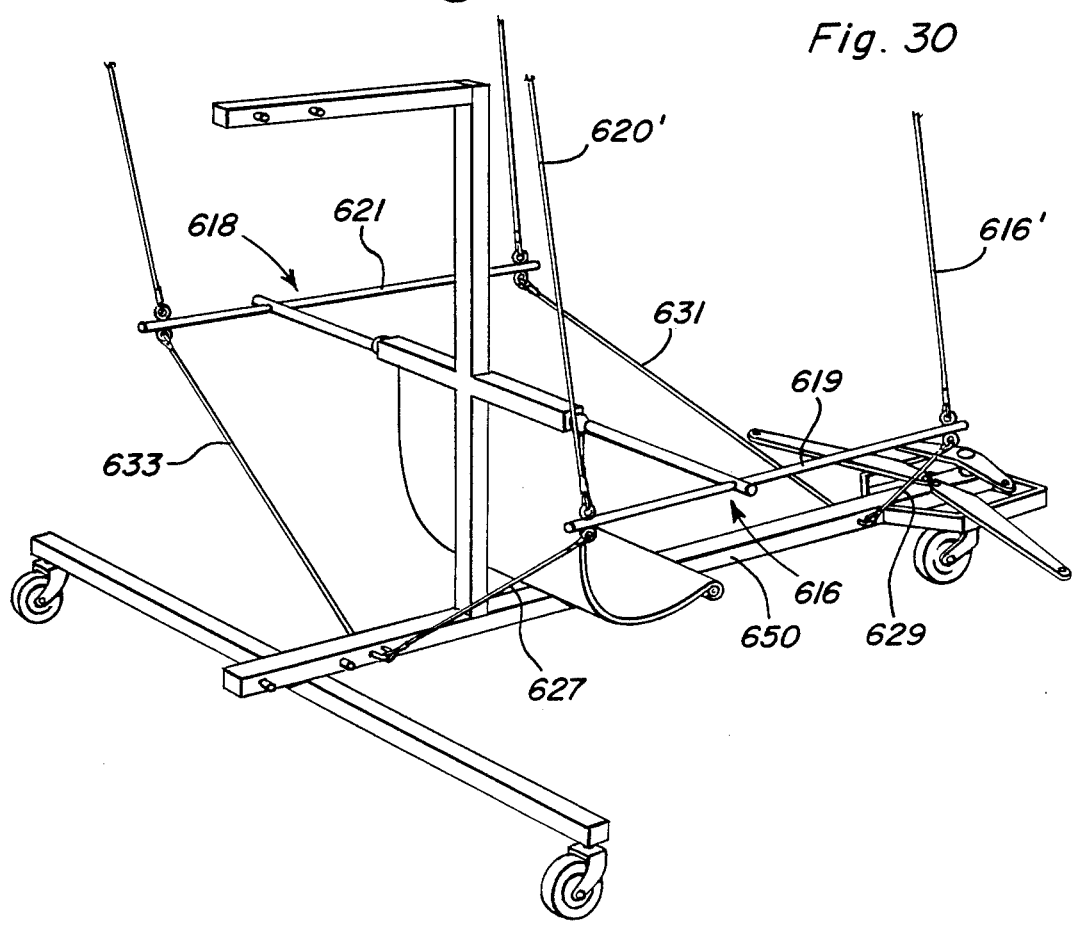
FIG. 30 is a partial rear end perspective view of a further modified flight vehicle for the aircraft of the present invention employing substantially longer anchor arms for connection of the load lines to the vehicle.

A final illustrated modification of the invention is shown in FIG. 30 in which the T-bar assembly comprising positioning lever elements 118 and anchor arms 116 for connection to the load line cables 16' and 20' of the previous embodiments are replaced by T-bar assemblies 616 and 618 which include longitudinally extending anchor arms 619 and 621, to which load lines 616' and 620' are connected through appropriate anchoring elements, and pivoted lever arms 623 and 625, for connecting anchor arms 619 and 621 to the main frame of the vehicle, as described in the previous embodiments. During flight the T-bar assemblies 616 and 618 are held in their selected position, as by cables 627, 629, 631 and 633 which connect the end of arms 619 and 621 to longitudinal main frame member 650.

As shown in the form of the invention of FIG. 30, the load line cables 616' and 620' can be connected to the flight vehicle at substantially greater distances than shown in the previous embodiments. By enlarging this distance, from that shown in the previous embodiments, such as in FIG. 3, to that shown in the modification of FIG. 30, the parachute angle of attack better follows the angle of the vehicle. This can be especially important when employing canard control surfaces such as shown in FIG. 27 so as to maintain better control.

It will be understood by those skilled in the art that the modifications of the invention shown in FIGS. 23 through 30 can be readily designed for easy disassembly and collapsing of the vehicle to reduce overall size for storage and transport purposes in a manner similar to that described in the previous embodiments. Thus, these modifications should not increase the storage size of the vehicle.

Furthermore, it will be readily appreciated by those skilled in the art that some or all of the wheels of the vehicle can be replaced by skis or saucers for use in snow covered ground areas without departing from the invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a ram air inflated flexible airfoil canopy having a leading edge portion extending spanwise transverse to a forward direction of travel, a trailing edge portion and a bottom portion extending chordwise between the leading and trailing edge portions, a pilot supporting vehicle having a longitudinal axis, a plurality of flexible load lines connecting the canopy to the vehicle, and powered means mounted on the vehicle for imparting forward thrust thereto in said forward direction of travel, the improvement comprising means for automatic orientation of the inflated canopy to produce aerodynamic forces thereon effecting both flight supporting positions and take-off at respectively different attitudes during propulsion of the vehicle by said forward thrust, including at least two pivotal load line anchors from which the load lines respectively extend to the leading edge portion of the canopy and to the bottom portion intermediate the leading and trailing edge portions, and means mounting said two anchors on the vehicle in fixed relation thereto for effecting said orientation o the canopy between said different attitudes thereof in response to changes in the forward thrust.

2. The improvement as defined in claim 1 wherein said anchor mounting means includes an arm on which the two anchors are located, and means connected to the vehicle for operatively positioning the arm in laterally spaced relation to the longitudinal axis in response to tensioning of the load lines.

3. The improvement as defined in claim 2 including means for locking the arm at an adjusted location along the longitudinal axis in response to said operative positioning thereof by the positioning means.

4. The improvement as defined in claim 1 wherein the powered means includes a fuel operated engine assembly mounted on the vehicle, propeller means drivingly connected to the engine assembly for rotation about a propeller axis substantially parallel to said longitudinal axis of the vehicle, and torque compensating means for balancing thrust components applied to the vehicle in response to rotation of the propeller means.

5. The improvement as defined in claim 4 wherein the torque compensating means includes transmission means drivingly connected between the engine assembly and the propeller means for transmitting torque in opposite directions, said propeller means comprising a pair of counter-rotating pusher propellers.

6. The improvement as defined in claim 1 including ground steering means mounted on the vehicle, steering control means connected to the canopy for directionally controlling airborne travel, and pilot operated means movably mounted on the vehicle for interrelated connection to the ground steering assembly and the steering control means to exercise similar directional control on the ground during said take-off and said level flight in common steering control movements.

7. In combination with a flexible airfoil canopy, a vehicle having a longitudinal axis, load lines interconnecting the canopy and the vehicle and powered means mounted on the vehicle for imparting thrust thereto in a forward direction parallel to said axis, the improvement comprising, means fixedly anchoring the load lines to the vehicle for automatic orientation of the inflated canopy producing aerodynamic forces thereon effecting both said take-off and said flight supporting position, and powered means propelling the vehicle both during take-off and flight supporting position in said forward direction at speeds inflating the canopy comprising a fuel operated engine assembly mounted on the vehicle, propeller means drivingly connected to the engine assembly for exerting said thrust by rotation about a propeller axis substantially parallel to said longitudinal axis of the vehicle, and torque compensating means for balancing components of the thrust independently of the load lines during said take-off and said flight supporting position.

8. The improvement as defined in claim 7 wherein the torque compensating means includes transmission means drivingly connected between the engine assembly and the propeller means for transmitting torque in opposite directions, said propeller means comprising a pair of counter-rotating pusher propellers.

9. In combination with a flexible airfoil canopy having leading and trailing edge portions, a bottom portion extending chordwise between the leading and trailing edge portions and a plurality of air cells open at the leading edge portion to inflate the canopy during forward travel, a self-propelled ground vehicle having a longitudinal axis, and a plurality of load lines connecting the canopy to the vehicle; the improvement comprising means automatically orientating the canopy when inflated for producing aerodynamic forces thereon effecting both take-off and flight supporting position, comprising an anchor arm having portions spaced along the longitudinal axis at which the load lines are anchored to the vehicle and respectively extend to the leading edge portion of the canopy and to the bottom portion intermediate the leading and trailing edge portions, and means responsive to tensioning of the load lines during said take-off and said flight supporting positions for locking the anchor arm in laterally spaced relation to the longitudinal axis of the vehicle to control change in attitude of the inflated canopy through which said take-off and said level flight is effected.

10. The improvement as defined in claim 9 including powered means mounted on the vehicle for imparting forward thrust thereto to control the change in attitude of the canopy between said take-off and said flight supporting position.

11. The improvement as defined in claim 10 including adjustable means for longitudinally changing the location of the positioned anchor arm relative to the vehicle in accordance with the load of the vehicle.

12. The improvement as defined in claim 9 including adjustable means for longitudinally changing the location of the positioned anchor arm relative to the vehicle in accordance with the load of the vehicle.

13. The combination comprising an aircraft having a flexible airfoil canopy and a self-propelled ground vehicle, a plurality of load lines connected to the canopy at chordwise spaced locations, anchor means pivotally connecting the load lines at longitudinally spaced anchor points to the vehicle for orientating the canopy when inflated to produce aerodynamic forces thereon, and means responsive to said aerodynamic forces exerted on the inflated canopy locking the anchor points to the vehicle for automatically changing said orientation of the canopy between optimum take-off, climb, flight supporting positions and descent positions.

14. The combination of claim 13 wherein said anchor means establishes load line connections to the canopy of unequal length from said spaced anchors.

15. The combination of claim 14 including forward thrust producing means mounted on the vehicle for controlling said change in attitude of the canopy at a substantially constant forward cruising speed of the aircraft.

16. The combination of claim 15 wherein said vehicle has a center of gravity located below said anchor means.

17. The combination of claim 13 wherein said vehicle has a center of gravity located below said anchor means.

18. The combination as defined in claim 13 wherein said anchor means comprises a cross bar connected to the vehicle, an anchor arm having spaced portions at which the load lines connect the canopy to the vehicle, and means mounted on the cross bar for locking the anchor arm to the vehicle in response to tensioning of the load lines by said aerodynamic lift forces exerted on the canopy.

19. In combination with a flexible airfoil canopy, a vehicle having supporting elements, a plurality of load lines connecting the vehicle to the canopy when inflated, and self-powered thrust producing means mounted on the vehicle for propulsion of the vehicle and the inflated canopy interconnected therewith by the load lines, the improvement comprising means anchoring the load lines to the vehicle for automatically orientating the inflated canopy relative to the vehicle in response to said propulsion thereof producing aerodynamic lift forces thereon effecting both take-off and flight supporting position, and thrust regulating means operatively connected to the thrust producing means for accelerating the vehicle in response to said take-off until the canopy is airborne at an attitude corresponding to said flight supporting position.

20. The improvement as defined in claim 19 wherein the thrust producing means includes a first propulsive propeller rotatably mounted in the vehicle, a second counter-rotating propulsive propeller and a pair of engines respectively connected to the first and second propellers.

21. The combination comprising a flexible airfoil canopy, a vehicle having a longitudinal axis, and a plurality of load lines connecting the canopy to the vehicle, a ground steering assembly mounted on the vehicle, steering control means connected to the canopy for directionally controlling airborne travel thereof, means operatively anchoring the load lines to the vehicle for automatic attitude control of the canopy in response to said airborne travel producing aerodynamic forces effecting both take-off and flight supporting positions, and pilot operated means movably mounted on the vehicle for actuating the ground steering assembly and the steering control means independently of said automatic control of the canopy to exercise similar directional control on the ground and in flight by common steering control movements.

22. An aircraft comprising: a ram air inflated flexible airfoil canopy for producing lift as a result of aerodynamic forces exerted thereon; a plurality of flexible load lines connected to the canopy; a vehicle suspended from the canopy by the load lines having powered means mounted thereon for imparting forward thrust thereto; anchor means connecting the load lines to the vehicle for automatic attitude control of the canopy in response to said aerodynamic forces effecting both take-off and level flight; and directional self-stabilization means incorporated into said vehicle for compensating non-forward thrust from said powered means independently of said attitude control of the canopy.

23. The aircraft as defined in claim 22 wherein the powered means and directional self-stabilization means include a pair of fuel operated engines each separately driving counter-rotating pusher propellers for transmitting substantially equal torque to the vehicle in opposite directions.

24. The aircraft as defined in claim 22 wherein the powered means comprises a single fuel operated engine mounted on the vehicle and driving a single propeller and said directional self-stabilization means comprises means for balancing the thrust torque component applied to the vehicle in response to rotation of the single propeller.

25. An aircraft comprising: a ram air inflated flexible airfoil canopy for producing lift as a result of aerodynamic forces exerted thereon; a plurality of flexible load lines connected to the canopy; a vehicle suspended by the load lines from the canopy having powered means thereon for imparting forward thrust thereto; anchor means connecting the load lines to the vehicle for automatic attitude control of said canopy effecting both take-off and flight supporting position in response to the aerodynamic forces; and canard control means mounted toward the front of the vehicle for directly controlling attitude of the vehicle independently of said attitude control of the canopy.

26. The aircraft as defined in claim 25 wherein said canard control means includes a pair of interconnected substantially flat surfaces mounted on the front end of the vehicle and a pilot operated lever operatively connected to said surfaces.

27. An aircraft as defined in claim 25 wherein said vehicle is pilot supporting and pilot controlled.

28. An aircraft comprising: a ram air inflated flexible airfoil canopy for producing lift resulting from aerodynamic forces exerted thereon; a vehicle having at least one powered propeller mounted thereon for imparting forward thrust thereto; means for suspending the vehicle from the canopy while airborne at attitudes respectively effecting take-off and flight supporting position in response to said aerodynamic forces; torque compensating means incorporated into said vehicle for compensating non-forward thrust from said at least one powered propeller independently of the canopy; and steering control means for directionally controlling airborne travel exclusively through the canopy.

29. An aircraft as defined in claim 28 wherein said steering control means is operatively connected to a trailing edge of the canopy to turn the aircraft by turning the canopy.

30. The aircraft as defined in claim 29 wherein said steering control means includes means for laterally shifting the center of gravity of the vehicle to impart a desired turn in the vehicle.

31. The aircraft as defined in claim 30 and including two counter-rotating powered propellers rotating about substantially the same longitudinal axis wherein said steering control means comprises separate means for controlling the speed of the counter-rotating propellers.

* * * * *